(12) United States Patent
Hiratsuka

(10) Patent No.: US 12,086,216 B2
(45) Date of Patent: Sep. 10, 2024

(54) INFORMATION PROCESSING DEVICE, INFORMATION PROCESSING METHOD, ELECTRONIC DEVICE, AND INFORMATION PROCESSING SYSTEM

(71) Applicant: SONY GROUP CORPORATION, Tokyo (JP)

(72) Inventor: Yosuke Hiratsuka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/440,831

(22) PCT Filed: Mar. 16, 2020

(86) PCT No.: PCT/JP2020/011362
§ 371 (c)(1),
(2) Date: Sep. 20, 2021

(87) PCT Pub. No.: WO2020/196005
PCT Pub. Date: Oct. 1, 2020

(65) Prior Publication Data
US 2022/0171831 A1    Jun. 2, 2022

(30) Foreign Application Priority Data

Mar. 28, 2019    (JP) ................. 2019-062504

(51) Int. Cl.
*G06F 21/10*    (2013.01)
*G06F 21/12*    (2013.01)
(Continued)

(52) U.S. Cl.
CPC .......... *G06F 21/105* (2013.01); *G06F 21/121* (2013.01); *G06F 21/31* (2013.01); *G06F 21/602* (2013.01)

(58) Field of Classification Search
CPC ...... G06F 21/10; G06F 21/105; G06F 21/121; G06F 21/44; G06F 21/31
See application file for complete search history.

(56) References Cited

U.S. PATENT DOCUMENTS

2009/0254482 A1    10/2009    Vadlamani et al.
2011/0296405 A1    12/2011    Ogura
(Continued)

FOREIGN PATENT DOCUMENTS

CN    101983381 A    3/2011
EP    2263167 A1    12/2010
(Continued)

OTHER PUBLICATIONS

Office Action for EP Patent Application No. 20779205.2, dated Mar. 11, 2022, 10 pages of Office Action.
(Continued)

*Primary Examiner* — Dao Q Ho
(74) *Attorney, Agent, or Firm* — CHIP LAW GROUP

(57) ABSTRACT

Provided is an information processing device that includes a license management unit that sets at least one of a first use start date and time or a first use end date and time of a license to be provided to a first electronic device on the basis of a date and time of a hardware clock, and responds to return of the license from the first electronic device and provision of a second electronic device with the license returned from the first electronic device until the date and time of the hardware clock pass a first valid period with reference to the first use start date and time or pass the first use end date and time.

14 Claims, 22 Drawing Sheets

(51) Int. Cl.
    *G06F 21/31*    (2013.01)
    *G06F 21/60*    (2013.01)

(56) References Cited

U.S. PATENT DOCUMENTS

| | | | |
|---|---|---|---|
| 2017/0109506 A1* | 4/2017 | Shetty | G06F 16/13 |
| 2018/0129791 A1 | 5/2018 | Shetty | |
| 2018/0232503 A1* | 8/2018 | Tsuboi | G06F 21/121 |
| 2021/0056179 A1 | 2/2021 | Hiratsuka | |

FOREIGN PATENT DOCUMENTS

| | | |
|---|---|---|
| EP | 3754524 A1 | 12/2020 |
| JP | 2010-204825 A | 9/2010 |
| JP | 2011-248777 A | 12/2011 |
| JP | 2017-134773 A | 8/2017 |
| JP | 2018-132874 A | 8/2018 |
| JP | 6904721 B2 | 7/2021 |
| JP | 2021-140829 A | 9/2021 |
| WO | 2009/126368 A1 | 10/2009 |
| WO | 2019/159690 A1 | 8/2019 |

OTHER PUBLICATIONS

International Search Report and Written Opinion of PCT Application No. PCT/JP2020/011362, dated Jun. 9, 2020, 09 pages of ISRWO.

\* cited by examiner

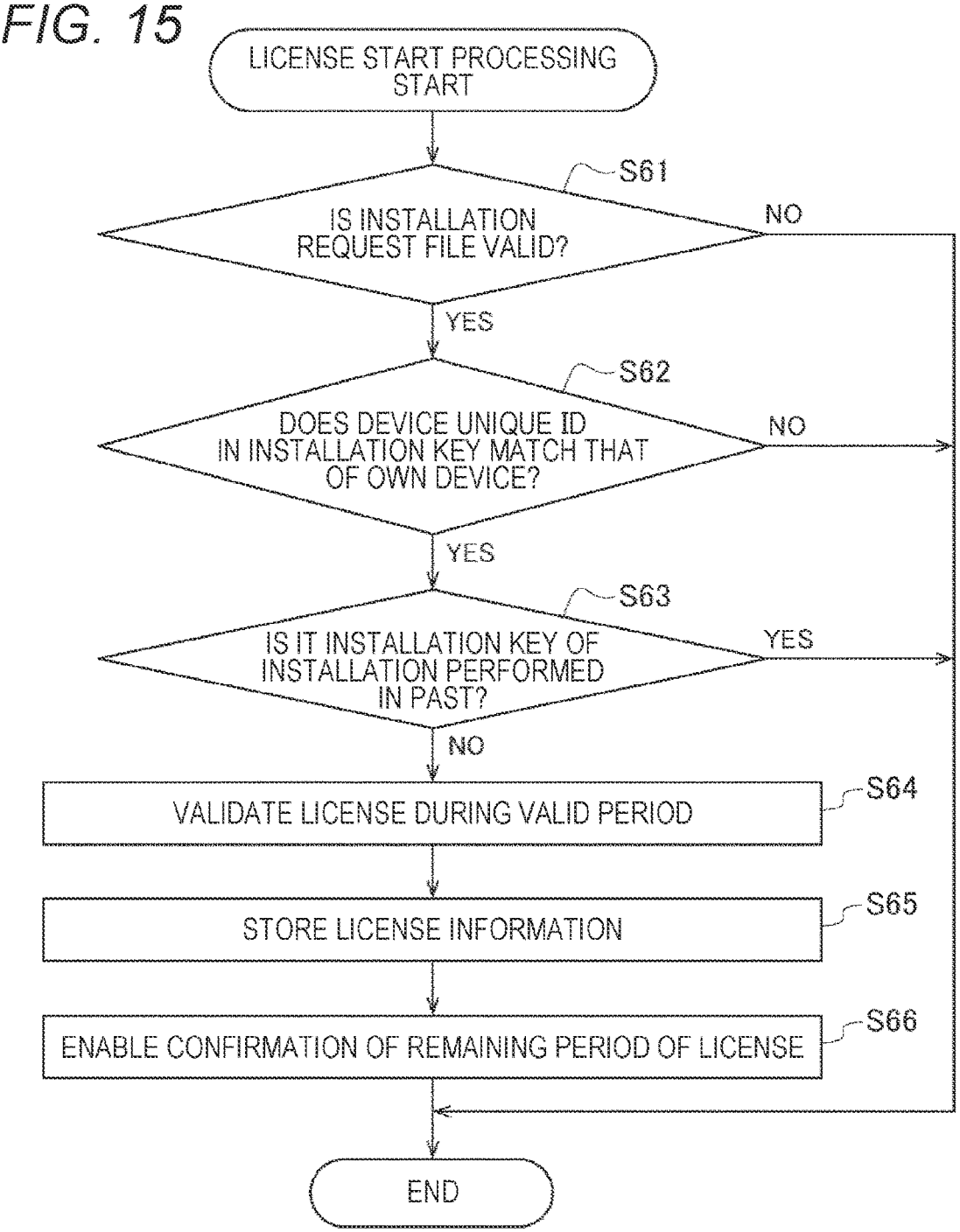

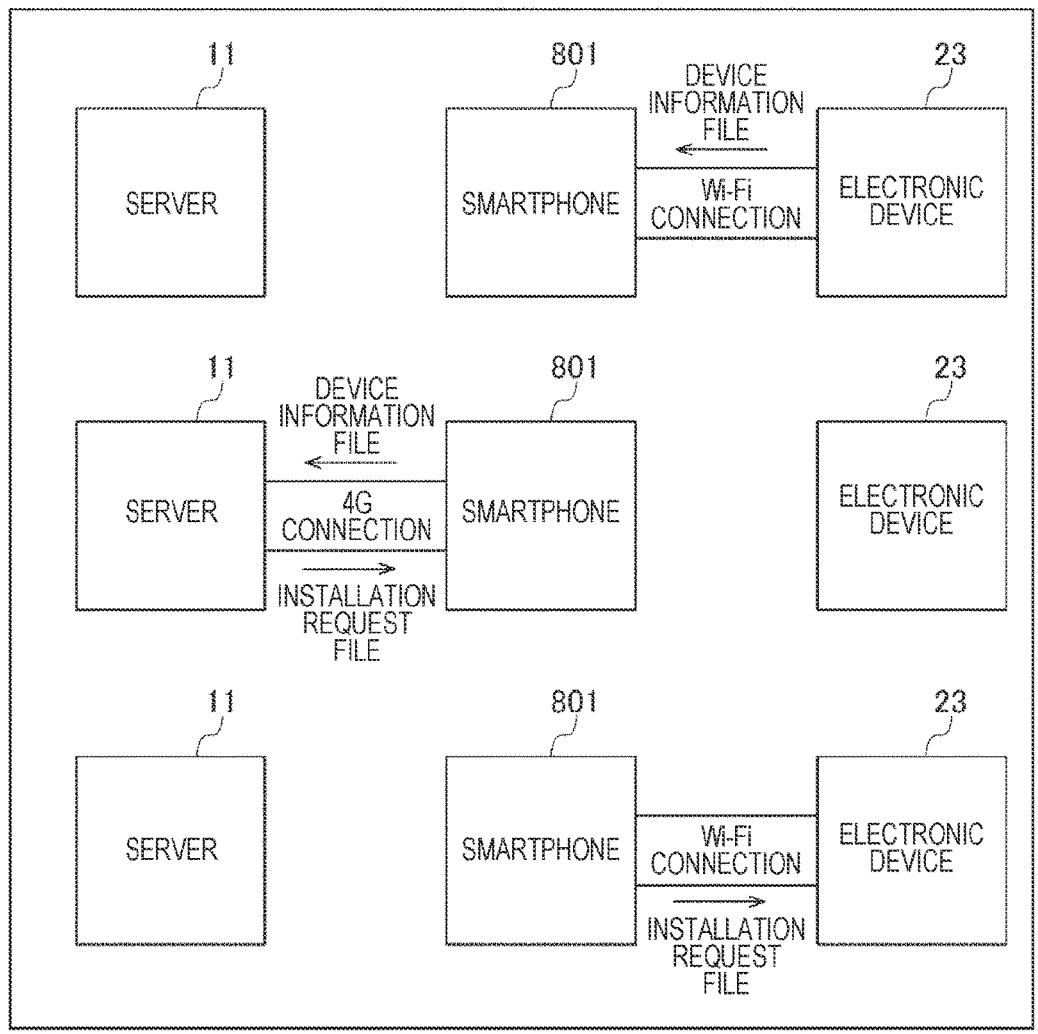

INFORMATION PROCESSING DEVICE, INFORMATION PROCESSING METHOD, ELECTRONIC DEVICE, AND INFORMATION PROCESSING SYSTEM

CROSS REFERENCE TO RELATED APPLICATIONS

This application is a U.S. National Phase of International Patent Application No. PCT/JP2020/011362 filed on Mar. 16, 2020, which claims priority benefit of Japanese Patent Application No. JP 2019-062504 filed in the Japan Patent Office on Mar. 28, 2019. Each of the above-referenced applications is hereby incorporated herein by reference in its entirety.

TECHNICAL FIELD

The present technology relates to an information processing device, an information processing method, a program, an electronic device, and an information processing system, and more particularly relates to an information processing device, an information processing method, a program, an electronic device, and an information processing system preferable for use in a case where a license provided by an information processing device is used in an electronic device that does not directly communicate with the information processing device.

BACKGROUND ART

Conventionally, a floating license is used as one of methods for providing a license of a function used in an electronic device from a server (see, for example, Patent Document 1). By using the floating license, the function can be used in more electronic devices than the number of licenses.

CITATION LIST

Patent Document

Patent Document 1: Japanese Patent Application Laid-Open No. 2017-134773

SUMMARY OF THE INVENTION

Problems to be Solved by the Invention

Meanwhile, there is a need to enable an electronic device that does not directly communicate with a server to use a floating license provided by the server with a time limit.

The present technology has been made in view of such a situation, and makes it possible to use a time-limited floating license in an electronic device that does not directly communicate with an information processing device such as a server that provides a floating license.

Solutions to Problems

An information processing device according to a first aspect of the present technology includes a license management unit that sets at least one of a first use start date and time or a first use end date and time of a license to be provided to a first electronic device on the basis of a date and time of a hardware clock, and responds to return of the license from the first electronic device and provision of a second electronic device with the license returned from the first electronic device until the date and time of the hardware clock pass a first valid period with reference to the first use start date and time or pass the first use end date and time.

An information processing method according to the first aspect of the present technology includes, by an information processing device, setting at least one of a use start date and time or a use end date and time of a license to be provided to a first electronic device on the basis of a date and time of a hardware clock, and responding to return of the license from the first electronic device and provision of a second electronic device with the license returned from the first electronic device until the date and time of the hardware clock pass a predetermined valid period with reference to the use start date and time or pass the use end date and time.

A program according to the first aspect of the present technology causes a computer to execute processing including setting at least one of a use start date and time or a use end date and time of a license to be provided to a first electronic device on the basis of a date and time of a hardware clock, and responding to return of the license from the first electronic device and provision of a second electronic device with the license returned from the first electronic device until the date and time of the hardware clock pass a predetermined valid period with reference to the use start date and time or pass the use end date and time.

An electronic device according to a second aspect of the present technology includes a first hardware clock, and a license management unit that sets at least one of a first use start date and time or a first use end date and time of a license provided from a first information processing device on the basis of a date and time of the first hardware clock, and makes a function corresponding to the license usable until the date and time of the first hardware clock pass a predetermined valid period with reference to the first use start date and time or pass the one use end date and time.

An information processing method according to the second aspect of the present technology includes, by an electronic device including a hardware clock, setting at least one of a use start date and time or a use end date and time of a license provided from an information processing device on the basis of a date and time of the hardware clock, and making a function corresponding to the license usable until the date and time of the hardware clock pass a predetermined valid period with reference to the use start date and time or pass the use end date and time.

A program according to the second aspect of the present technology causes a computer of an electronic device including a hardware clock to execute processing including, setting at least one of a use start date and time or a use end date and time of a license provided from an information processing device on the basis of a date and time of the hardware clock, and making a function corresponding to the license usable until the date and time of the hardware clock pass a predetermined valid period with reference to the use start date and time or pass the use end date and time.

An information processing system according to a third aspect of the present technology includes an information processing device, a first electronic device including a first hardware clock, and a second electronic device, in which the information processing device sets at least one of a first use start date and time or a first use end date and time of a license to be provided to the first electronic device on the basis of a date and time of a second hardware clock, and responds to return of the license from the first electronic device and provision of the second electronic device with the license returned from the first electronic device until the date and time of the second hardware clock pass a predetermined valid period with reference to the first use start date and time or pass the first use end date and time, and the first electronic device sets at least one of a second use start date and time or a second use end date and time on the basis of a date and time of the first hardware clock, and makes a function corresponding to the license usable until the date and time of the first hardware clock pass the valid period with reference to the second use start date and time or pass the one use end date and time.

In the first aspect of the present technology, at least one of a first use start date and time or a first use end date and time of a license to be provided to a first electronic device is set on the basis of a date and time of a hardware clock, and return of the license from the first electronic device and provision of a second electronic device with the license returned from the first electronic device are responded until the date and time of the hardware clock pass a first valid period with reference to the first use start date and time or pass the first use end date and time.

In the second aspect of the present technology, at least one of a use start date and time or a use end date and time of a license provided from an information processing device is set on the basis of a date and time of the hardware clock, and a function corresponding to the license is made usable until the date and time of the hardware clock pass a predetermined valid period with reference to the use start date and time or pass the use end date and time.

In the third aspect of the present technology, in the information processing device, at least one of a first use start date and time or a first use end date and time of a license to be provided to the first electronic device is set on the basis of a date and time of a second hardware clock, and return of the license from the first electronic device and provision of the second electronic device with the license returned from the first electronic device are responded until the date and time of the second hardware clock pass a predetermined valid period with reference to the first use start date and time or pass the first use end date and time, and in the first electronic device, at least one of a second use start date and time or a second use end date and time is set on the basis of a date and time of the first hardware clock, and a function corresponding to the license is made usable until the date and time of the first hardware clock pass the valid period with reference to the second use start date and time or pass the one use end date and time.

BRIEF DESCRIPTION OF DRAWINGS

FIG. 14 is a diagram illustrating a format example of an installation key.

FIG. 15 is a flowchart for explaining license start processing executed by the electronic device.

FIGS. 31A, 31B, and 31C are diagrams illustrating a modification example of a method of exchanging data between the server and the electronic device.

MODE FOR CARRYING OUT THE INVENTION

Hereinafter, a mode for carrying out the present technology will be described. The description will be made in the following order.

1. Embodiment
2. Modification examples
3. Others

1. Embodiment

First, an embodiment of the present technology will be described with reference to FIGS. 1 to 30.

<Configuration Example of Information Processing System 10>

Figure 1:
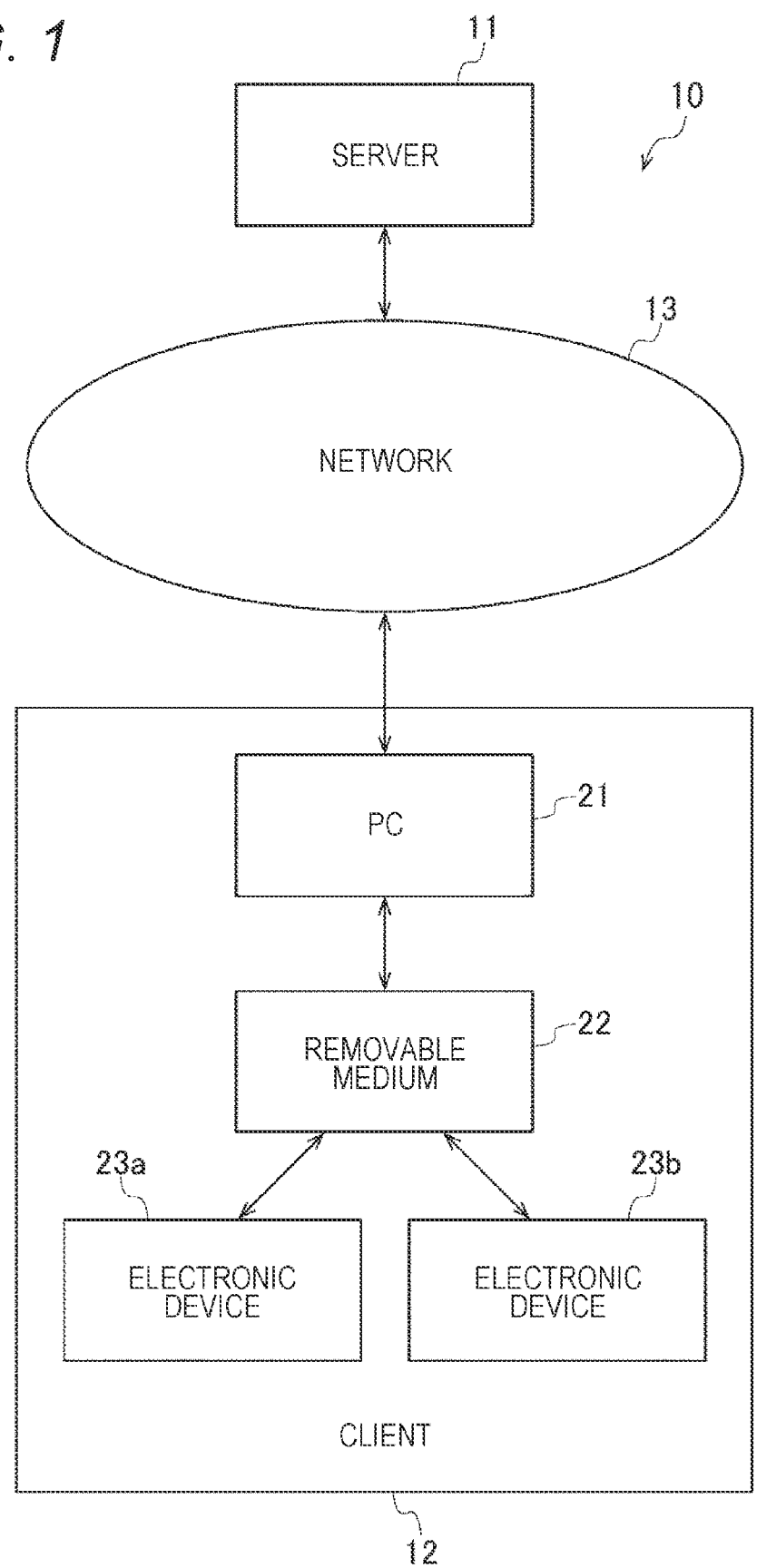
FIG. 1 is a block diagram illustrating one embodiment of an information processing system to which the present technology is applied.

FIG. 1 illustrates a configuration example of an information processing system 10 to which the present technology is applied.

The information processing system 10 includes a server 11, a client 12, and a network 13. The client 12 includes a personal computer (PC) 21, a removable medium 22, an electronic device 23a, and an electronic device 23b.

The server 11 and the PC 21 are connected via a network 13 and communicate with each other.

The server 11 provides and manages a license (floating license) of a function used in the electronic device 23a and the electronic device 23b, and performs provision of software for achieving the functions of the electronic device 23a and the electronic device 23b, and the like.

The PC 21 communicates with the server 11 via the network 13 to exchange various data with the server 11. For example, the PC 21 receives, from the server 11, data related to a license of a function used in the electronic device 23a and the electronic device 23b, and various data such as software used in the electronic device 23a and the electronic device 23b. Furthermore, the PC 21 transmits various data such as data related to the electronic device 23a and the electronic device 23b to the server 11.

The removable medium 22 includes a magnetic disk, an optical disk, a magneto-optical disk, a semiconductor memory, or the like, and is used to exchange various data between the PC 21 and the electronic device 23a and the electronic device 23b. Note that the removable medium 22 may be a general-purpose removable medium or a removable medium having a security function.

Note that, hereinafter, the removable medium 22 is also simply referred to as a medium 22.

The electronic device 23a and the electronic device 23b are difficult to connect to the network 13, and basically do not directly communicate with the server 11 and are used offline. Furthermore, by installing a license provided from the server 11 via the medium 22, the electronic device 23a and the electronic device 23b can use the function corresponding to the installed license. Moreover, the electronic device 23a and the electronic device 23b return the license provided from the server 11 to the server 11 via the medium 22 and the PC 21 as necessary.

Note that, hereinafter, in a case where it is not necessary to individually distinguish the electronic device 23a and the electronic device 23b, the electronic device 23a and the electronic device 23b are simply referred to as an electronic device 23.

Furthermore, the type of the electronic device 23 is not particularly limited. Hereinafter, a case where the electronic device 23 is a camera will be mainly described as an example.

Moreover, the type of the function that is the subject of a license provided by the server 11 is not particularly limited. For example, the function does not necessarily have to be a function using software, and may be a function achieved only by hardware.

Furthermore, the server 11 may also provide software for achieving the function that is the subject of the license. In this case, the license of the function is also a license of the software for achieving the function.

Moreover, although only one client 12 is illustrated in FIG. 1 for clarity of illustration and description, a plurality of clients 12 is provided in practice. Moreover, although only one server 11 is illustrated, a plurality of servers 11 may be provided. Furthermore, one client 12 may include a plurality of at least one of the PC 21 or the medium 22, or may include two or more electronic devices 23.

<Configuration Example of Server 11>

Figure 2:
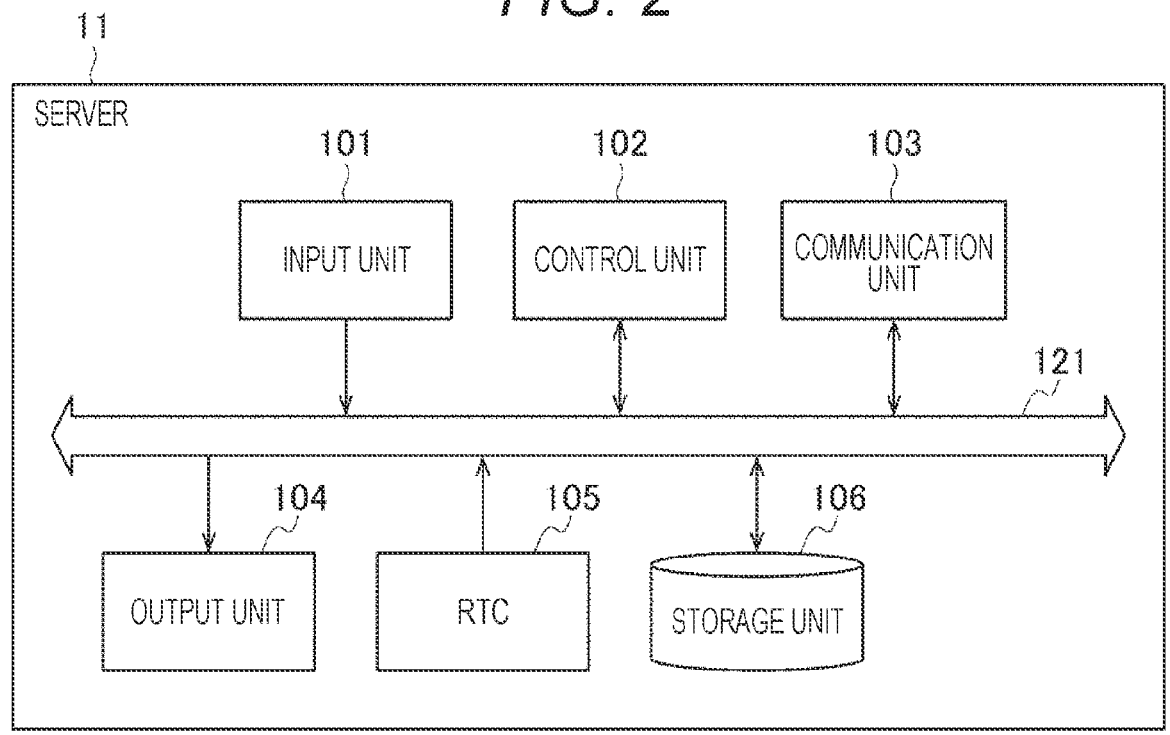
FIG. 2 is a block diagram illustrating a configuration example of a server.

FIG. 2 illustrates a configuration example of the server 11.

The server 11 includes an input unit 101, a control unit 102, a communication unit 103, an output unit 104, a real time clock (RTC) 105, and a storage unit 106. The input unit 101, the control unit 102, the communication unit 103, the output unit 104, the RTC 105, and the storage unit 106 are mutually connected via a bus 121.

The input unit 101 includes, for example, an input device such as a switch, a button, a key, a microphone, or an imaging element, and is used to input various data. The input unit 101 supplies the input data to each unit of the server 11 via the bus 121.

The control unit 102 includes, for example, a processor such as a central processing unit (CPU) and controls processing of each unit of the server 11.

The communication unit 103 includes, for example, a communication device or the like, and communicates with another information processing device such as the PC 21 via the network 13. Note that a communication method of the communication unit 103 is not particularly limited, and may be either a wired or wireless communication method. Furthermore, for example, the communication unit 103 may support a plurality of communication methods.

The output unit 104 includes, for example, an output device such as a display, a speaker, a lighting device, or a vibrator, and outputs various data by image, sound, light, vibration, or the like.

The RTC 105 is a hardware clock that continues to operate with a backup battery (not illustrated) or the like even when the server 11 is powered off. The RTC 105 is managed so that a user cannot change the date and time (date and time).

The storage unit 106 includes at least a nonvolatile storage medium, and stores various data and software necessary for processing of the server 11.

Note that, hereinafter, in a case where each unit of the server 11 performs data exchange or the like via the bus 121, the description of the bus 121 is appropriately omitted. For example, in a case where the control unit 102 and the communication unit 103 exchange data via the bus 121, it is simply described that the control unit 102 and the communication unit 103 exchange data.

<Configuration Example of Function of Control Unit 102>

Figure 3:
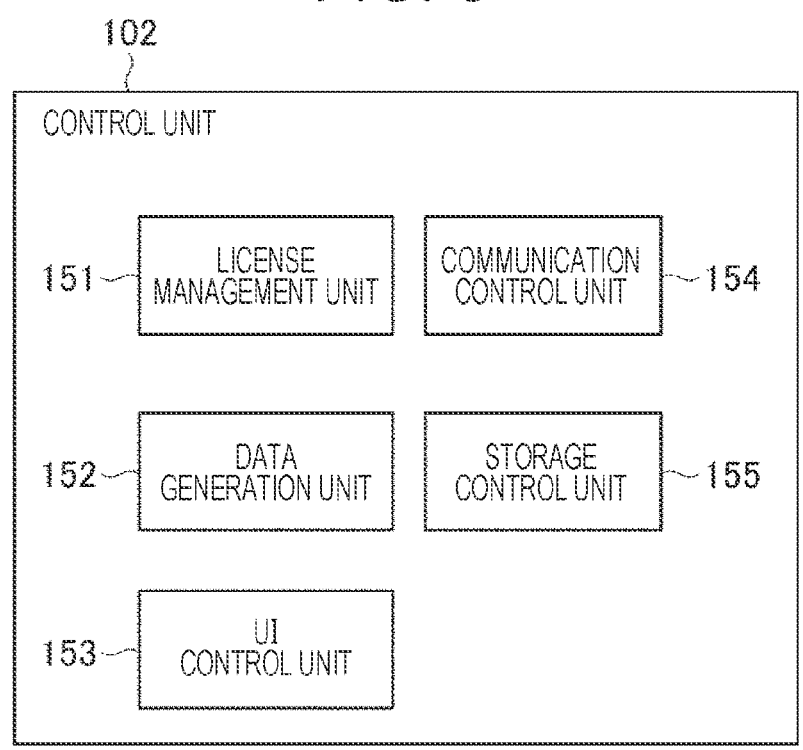
FIG. 3 is a block diagram illustrating a configuration example of functions of a control unit of the server.

FIG. 3 illustrates a configuration example of functions of the control unit 102 of the server 11. For example, the control unit 102 executes a control program to achieve functions including a license management unit 151, a data generation unit 152, a user interface (UI) control unit 153, a communication control unit 154, and a storage control unit 155.

The license management unit 151 manages a license of a function used in the electronic device 23.

The data generation unit 152 generates various data to be transmitted to the PC 21.

The UI control unit 153 controls user interfaces in the PC 21 and the electronic device 23. For example, the UI control unit 153 controls the user interface in the PC 21 by generating a display control file for displaying various information on the screen of the PC 21 and transmitting the display control file to the PC 21.

The communication control unit 154 controls communication processing by the communication unit 103. Furthermore, the communication control unit 154 acquires data to be transmitted to the PC 21 from each unit of the server 11, and supplies data received from the PC 21 to each unit of the server 11.

The storage control unit 155 controls storage of data or the like related to the license of the function to be used in the electronic device 23 in the storage unit 106.

<Configuration Example of Electronic Device 23>

Figure 4:
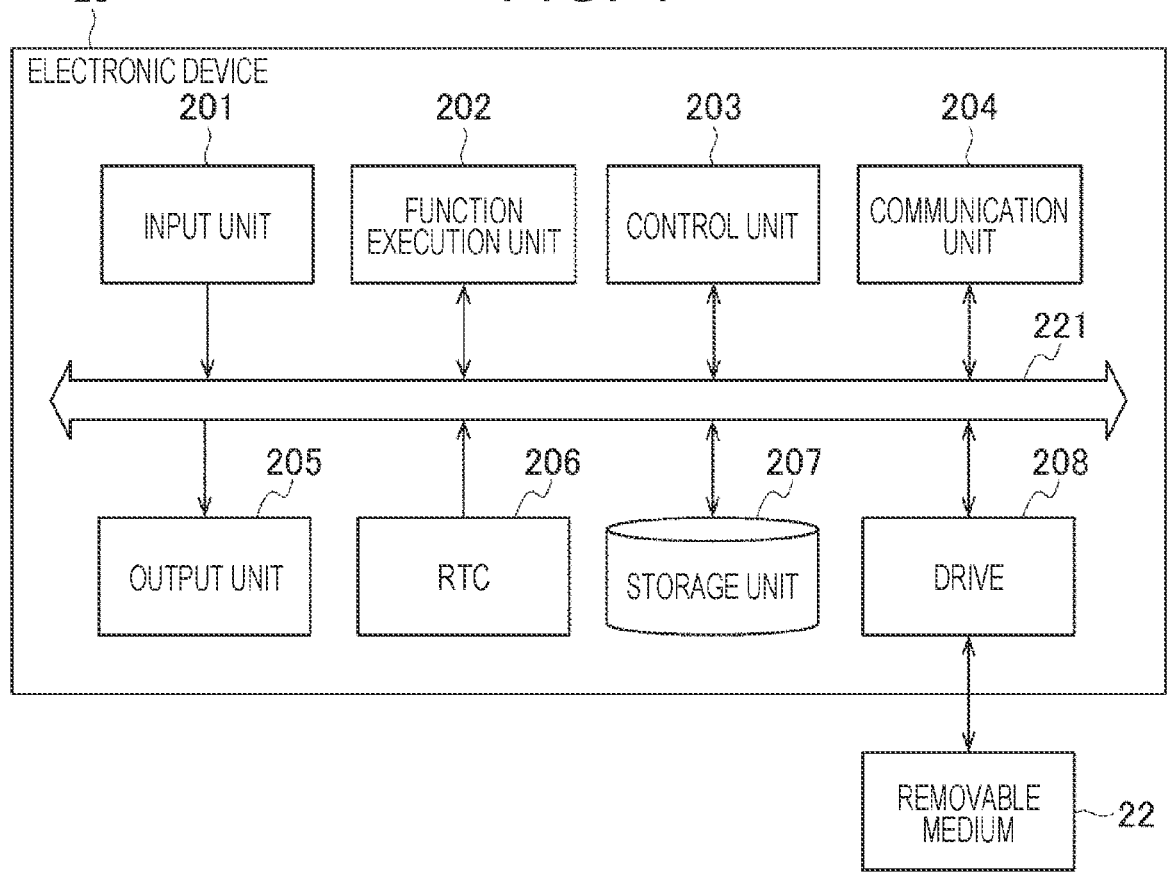
FIG. 4 is a block diagram illustrating a configuration example of an electronic device.

FIG. 4 illustrates a configuration example of the electronic device 23.

The electronic device 23 includes an input unit 201, a function execution unit 202, a control unit 203, a communication unit 204, an output unit 205, a real time clock (RTC) 206, a storage unit 207, and a drive 208. The input unit 201, the function execution unit 202, the control unit 203, the communication unit 204, the output unit 205, the RTC 206, the storage unit 207, and the drive 208 are mutually connected via a bus 221.

The input unit 201 includes, for example, an input device such as a switch, a button, a key, a microphone, or an imaging element, and is used to input various data. The input unit 201 supplies the input data to each unit of the electronic device 23 via the bus 221.

The function execution unit 202 includes various types of hardware and software for executing functions of the electronic device 23. For example, in a case where the electronic device 23 is a camera, the function execution unit 202 includes a lens, an imaging element, and the like.

The control unit 203 includes, for example, a processor such as a central processing unit (CPU) and controls processing of each unit of the electronic device 23.

The communication unit 204 includes, for example, a communication device or the like, and communicates with another electronic device (for example, a smartphone or the like) that is not illustrated. Note that a communication method of the communication unit 204 is not particularly limited, and may be either a wired or wireless communication method. Furthermore, for example, the communication unit 204 may support a plurality of communication methods.

The output unit 205 includes, for example, an output device such as a display, a speaker, a lighting device, or a vibrator, and outputs various data by image, sound, light, vibration, or the like.

The RTC 206 is a hardware clock that continues to operate with a backup battery or the like even when the power of the electronic device 23 is turned off. The RTC 206 is managed so that the user cannot change the date and time (date and time).

The storage unit 207 includes at least a nonvolatile storage medium, and stores various data and software necessary for processing of the electronic device 23.

The drive 208 is detachable from the medium 22, and drives the connected medium 22.

Note that, hereinafter, in a case where each unit of the electronic device 23 performs data exchange or the like via the bus 221, the description of the bus 221 is appropriately omitted. For example, in a case where the control unit 203 and the communication unit 204 exchange data via the bus 221, it is simply described that the control unit 203 and the communication unit 204 exchange data.

<Configuration Example of Function of Control Unit 203>

Figure 5:
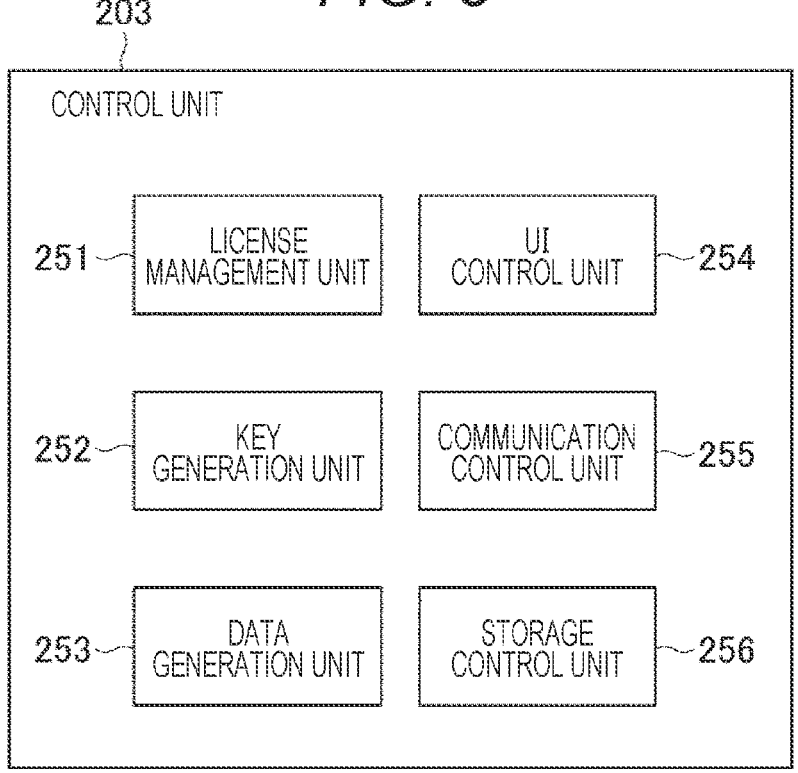
FIG. 5 is a block diagram illustrating a configuration example of functions of a control unit of the electronic device.

FIG. 5 illustrates a configuration example of functions of the control unit 203 of the electronic device 23. For example, the control unit 203 executes a control program to achieve functions including a license management unit 251, a key generation unit 252, a data generation unit 253, a user interface (UI) control unit 254, a communication control unit 255, and a storage control unit 256.

The license management unit 251 manages a license of a function used in the electronic device 23.

The key generation unit 252 generates a device unique key that is a unique secret key different for each electronic device 23.

The data generation unit 253 generates various data to be transmitted to the server 11 via the medium 22 and the PC 21.

The UI control unit 254 controls the output unit 205 to control the user interface in the electronic device 23.

The communication control unit 255 controls communication processing by the communication unit 204. Furthermore, the communication control unit 255 acquires data to be transmitted to the outside via the communication unit 204 from each unit of the electronic device 23, and supplies data received from the outside via the communication unit 204 to each unit of the electronic device 23.

The storage control unit 256 controls storage of data or the like related to the license of the function to be used in the electronic device 23 in the storage unit 207.

<Processing of information processing system 10>

Next, processing of the information processing system 10 will be described with reference to FIGS. 6, 7, 8, 9, 10, 11, 12, 13, 14, 15, 16, 17, 18, 19, 20, 21, 22, 23, 24, 25, 26, 27, 28, 29, 30, 31A, 31B, 31C, 32A, and 32B.

Note that, hereinafter, an example of a case where a license of a certain function is first installed in the electronic device 23a and then the license of the function is transferred to the electronic device 23b will be described.

<License Acquisition Processing>

First, license acquisition processing executed by the client 12 will be described with reference to a flowchart of FIG. 6.

In step S1, the PC 21 requests a device information acquisition file.

Figure 7:
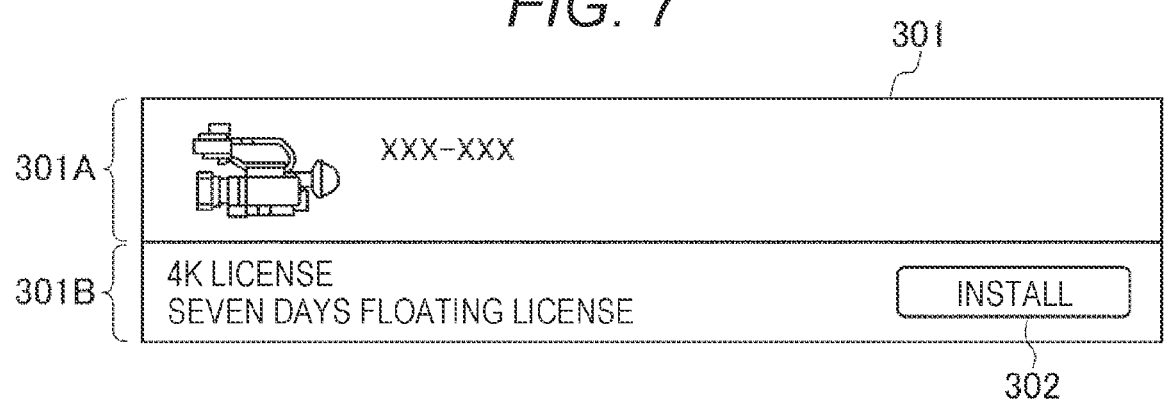
FIG. 7 is a diagram illustrating an example of a screen of a PC.

For example, the PC 21 accesses the server 11 via the network 13 according to an operation by the user, and displays a screen for acquiring a license of a function to be used in the electronic device 23a. For example, a window 301 of FIG. 7 is displayed on the screen of the PC 21.

The window 301 is divided into a device information field 301A and a license information field 301B.

At the left end of the device information field 301A, an image and a model name of the electronic device 23a are displayed side by side.

At the left end of the license information field 301B, the function for which a license is to be acquired and the type of the license are indicated. In this example, it is illustrated that a floating license of a 4K image capturing function with a valid period of seven days is to be acquired. Note that floating licenses with two or more types of valid periods may be displayed as acquisition targets, so as to enable selection of a floating license having a desired valid period.

Figure 8:
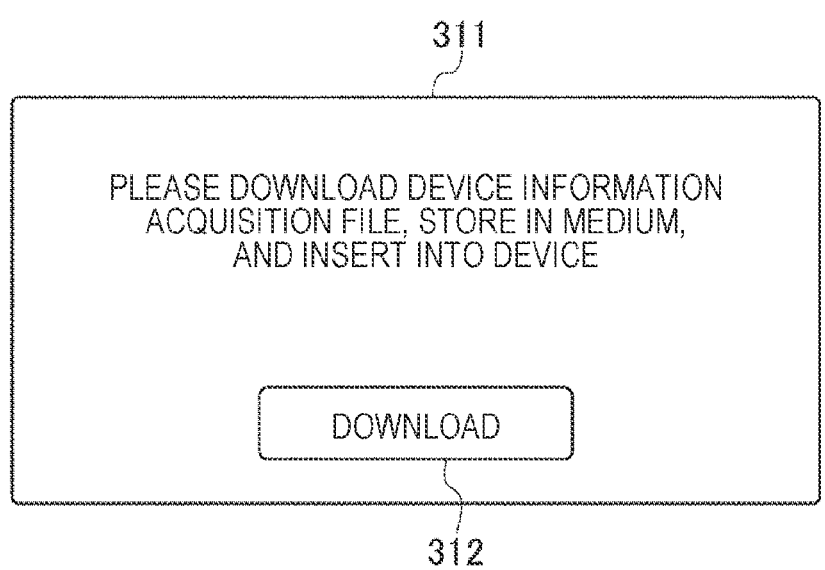
FIG. 8 is a diagram illustrating an example of a screen of the PC.

An install button 302 is displayed at a right end of the license information field 301B. When the install button 302 is pressed, for example, a window 311 of FIG. 8 is displayed on the screen of the PC 21.

The window 311 displays a message prompting to download the device information acquisition file, save the device information acquisition file in the medium 22, and insert the medium 22 into the device (electronic device 23a), and a download button 312. When the download button 312 is pressed, the PC 21 requests the server 11 for the device information acquisition file via the network 13.

In response to this, the server 11 transmits the device information acquisition file to the PC 21 via the network 13 in step S31 in FIG. 13 described later.

In step S2, the PC 21 receives the device information acquisition file transmitted from the server 11. Furthermore, the PC 21 stores the received device information acquisition file in the medium 22, for example, according to an operation by the user.

In step S3, the electronic device 23*a* executes a command in the device information acquisition file.

Specifically, the user removes the medium 22 storing the device information acquisition file from the PC 21 and connects the medium 22 to the drive 208 of the electronic device 23*a*.

The drive 208 reads the device information acquisition file stored in the medium 22 and supplies the device information acquisition file to the control unit 203. The control unit 203 executes a device information acquisition command included in the device information acquisition file. Thus, acquisition processing of device information is started.

Note that, for example, the processes of steps S1 to S3 may be omitted, and the acquisition processing of the device information may be started by the user operating the electronic device 23*a* without using the device information acquisition command.

In step S4, the key generation unit 252 determines whether or not a device unique key has been generated. In a case where the device unique key is not stored in the storage unit 207, the key generation unit 252 determines that the device unique key has not been generated, and the processing proceeds to step S5.

In step S5, the key generation unit 252 generates a device unique key. A method of generating the device unique key is not particularly limited. The storage control unit 256 stores the device unique key in the storage unit 207.

That is, the electronic device 23*a* generates the device unique key that is a secret key unique to the electronic device 23*a* before generating device information file for the first time after shipment from the factory. Thus, it is not necessary to generate the device unique key at the time of factory shipment and store the device unique key in the electronic device 23*a*, and a risk such as leakage of the device unique key is reduced. Furthermore, for example, by changing firmware of the electronic device 23*a* or the like, a method of generating the device unique key, a generation timing, or the like can be changed, and flexibility is improved.

Thereafter, the processing proceeds to step S6.

On the other hand, in step S4, in a case where the device unique key is stored in the storage unit 207, the key generation unit 252 determines that the device unique key has been generated, the process of step S5 is skipped, and the processing proceeds to step S6.

In step S6, the electronic device 23*a* generates a device information file.

Specifically, the data generation unit 253 reads the device unique key and a server public key from the storage unit 207. Note that the server public key is a public key corresponding to the server secret key held by the server 11, and is distributed to the electronic device 23*a* in advance. The data generation unit 253 encrypts the device unique key using the server public key. Thus, security of the device unique key is ensured, and falsification, eavesdropping, and the like of the device unique key are prevented.

Furthermore, the data generation unit 253 reads a firmware version and a device unique ID from the storage unit 207. The firmware version is a version of firmware currently installed in the electronic device 23*a*. The device unique ID is an ID uniquely assigned to each electronic device 23, and includes, for example, a model name and a serial number of the electronic device 23*a*. The data generation unit 253 generates storage data including a model name, a firmware version, a device unique ID, and an encrypted device unique key of the electronic device 23*a*.

Moreover, the data generation unit 253 calculates a hash value of the storage data using the device unique key. Note that a hash function used to calculate the hash value is not particularly limited.

Then, the data generation unit 253 generates the device information file including the storage data and the hash value. Thus, security of the storage data is ensured using the device unique key.

Information included in the device information file is used for license issuance in the server 11 as license request information for requesting license issuance.

In step S7, the data generation unit 253 stores the device information file in the medium 22 via the drive 208.

Figure 9:
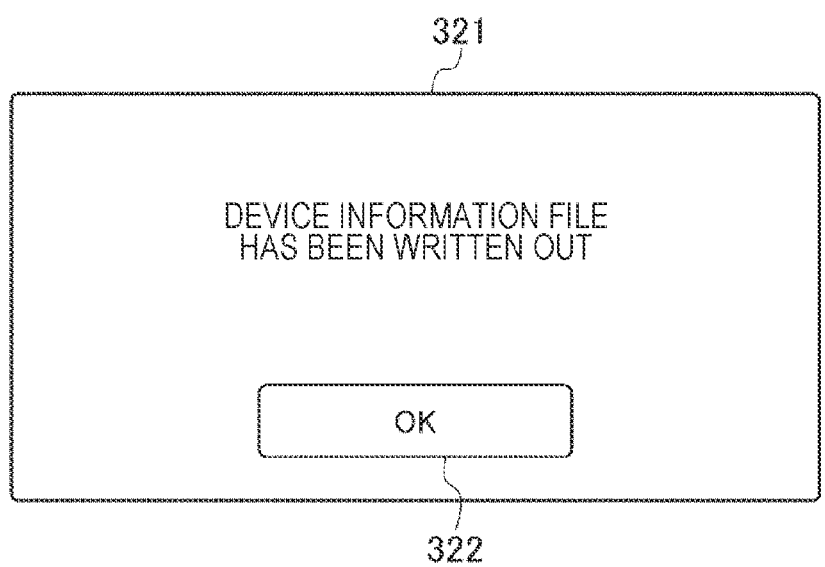
FIG. 9 is a diagram illustrating an example of a screen of the electronic device.
Figure 10:
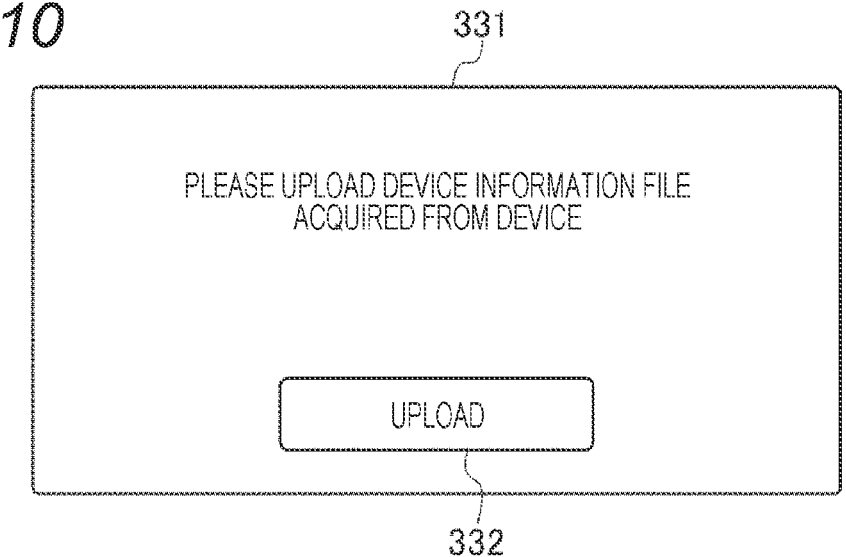
FIG. 10 is a diagram illustrating an example of a screen of the PC.

At this time, for example, the output unit 205 displays a window 321 of FIG. 9 under control of the UI control unit 254. In the window 321, a message notifying that the device information file has been written and an OK button 322 are displayed. When the OK button 322 is pressed, the window 321 is closed.

In step S8, the PC 21 transmits the device information file to the server 11.

For example, the user removes the medium 22 from the electronic device 23*a* and connects to the PC 21. For example, the PC 21 displays a window 331 of FIG. 10 on the screen.

In the window 331, a message prompting to upload the device information file acquired from the device (electronic device 23*a*) and an upload button 332 are displayed. When the upload button 332 is pressed, the PC 21 reads the device information file from the medium 22 and transmits the device information file to the server 11 via the network 13.

On the other hand, the server 11 receives the device information file in step S32 in FIG. 13 described later.

In step S9, the PC 21 determines whether or not to acquire an installation request file.

In a case where it is determined that the device information file received from the PC 21 is valid, the server 11 transmits the display control file for final confirmation of implementation of the license installation via the network 13 in step S34 in FIG. 13 described later.

Figure 11:
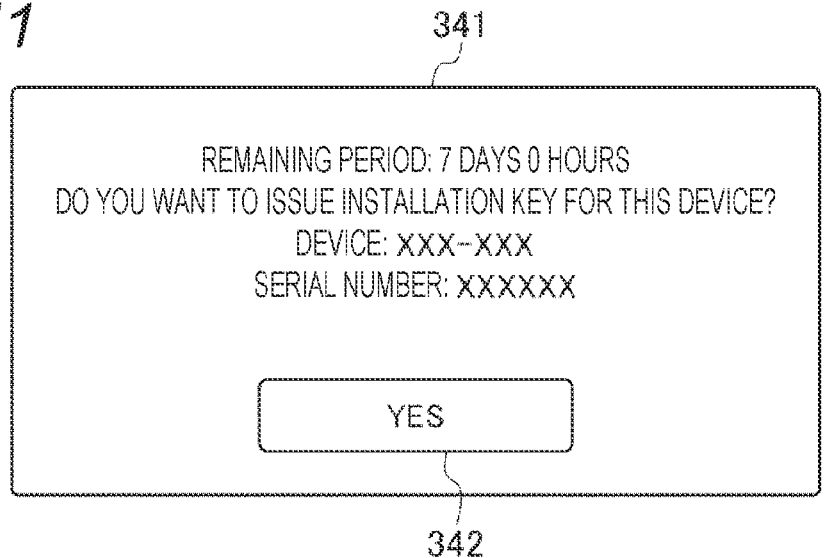
FIG. 11 is a diagram illustrating an example of a screen of the PC.

The PC 21 displays a window 341 of FIG. 11 on the screen on the basis of the display control file.

Figure 12:
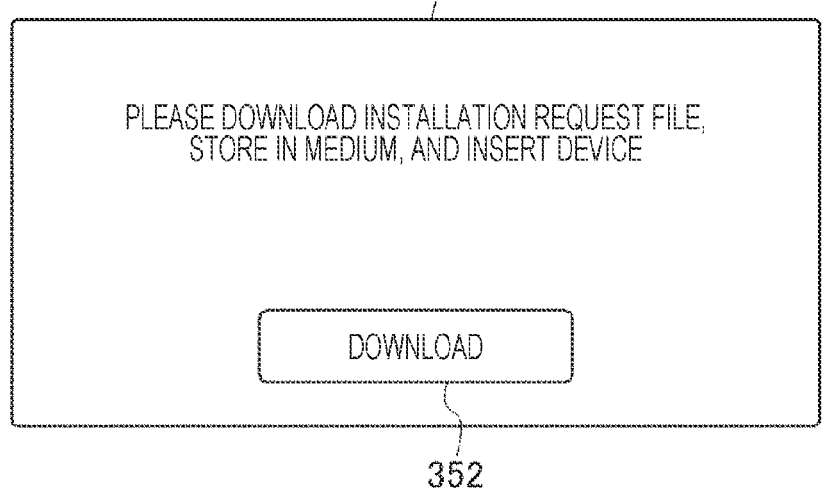
FIG. 12 is a diagram illustrating an example of a screen of the PC.

In the window 341, a remaining period of the license, a message asking whether or not to issue an installation key for the device (the electronic device 23*a*), the model name of the electronic device 23*a*, the serial number of the electronic device 23*a*, and a YES button 342 are displayed. When the YES button 342 is pressed, for example, a window 351 of FIG. 12 is displayed on the screen of the PC 21.

Note that the remaining period of the license of the window 341 is equal to an initial value (hereinafter referred to as a maximum valid period) of the valid period of the license because use of the license has not been started yet.

In the window 351, a message prompting to download the installation request file, save the installation request file in the medium 22, and insert the medium 22 into the device (electronic device 23*a*), and a download button 352 are displayed. Then, when the download button 352 is pressed, the PC 21 determines to acquire the installation request file, and requests the server 11 to transmit the installation request file via the network 13. Thereafter, the processing proceeds to step S10.

In response to this, in step S39 in FIG. 13 described later, the server 11 transmits the installation request file including the installation key and the like and including license communication information which is information used for license installation.

In step S10, the PC 21 receives the installation request file from the server 11 via the network 13.

In step S11, the PC 21 stores the installation request file in the medium 22, for example, according to an operation by the user.

Thereafter, the license acquisition processing ends.

On the other hand, in step S9, in a case where the display control file for final confirmation of implementation of the license installation has not been received, or in a case where acquisition of the installation request file has not been instructed, the PC 21 determines not to acquire the installation request file. Thereafter, the processes of steps S10 and S11 are skipped, the installation request file is not acquired, and the license acquisition processing ends.

<License Issuance Processing>

Next, license issuance processing executed by the server 11 in response to the license acquisition processing by the client 12 of FIG. 6 will be described with reference to a flowchart of FIG. 13.

Figure 6:
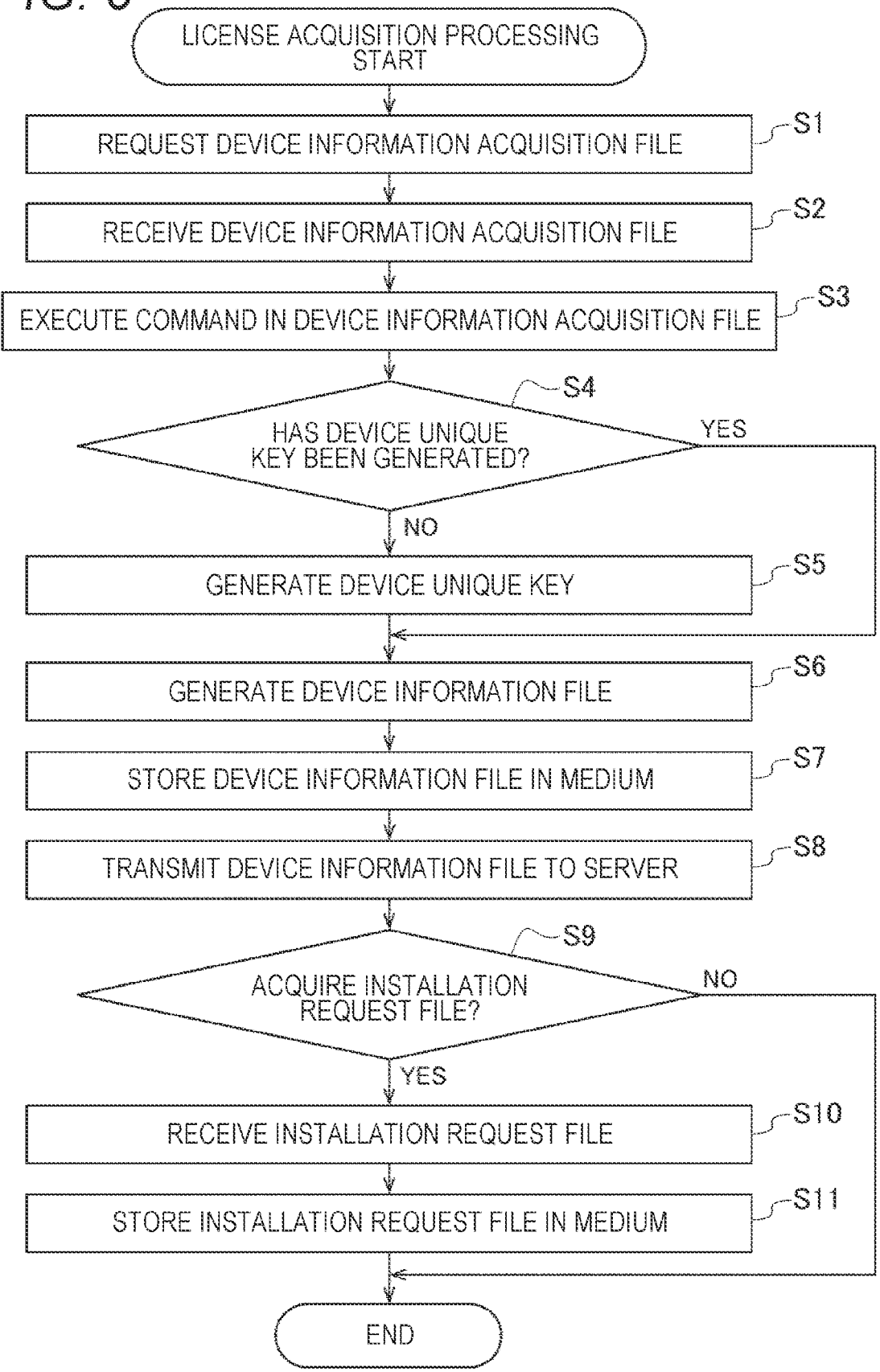
FIG. 6 is a flowchart for explaining license acquisition processing executed by a client.

Note that this processing is started, for example, when the server 11 is requested for the device information acquisition file from the PC 21 in step S1 in FIG. 6 described above.

In step S31, the server 11 transmits the device information acquisition file. Specifically, the data generation unit 152 generates the device information acquisition file including the device information acquisition command. The communication unit 103 transmits the device information acquisition file to the PC 21 via the network 13 under control of the communication control unit 154.

Note that, as described above, by omitting the processes of steps S1 to S3 in FIG. 6 of the electronic device 23*a*, the process of step S31 can be omitted.

In step S32, the server 11 receives the device information file. Specifically, the communication control unit 154 receives, via the communication unit 103, the device information file transmitted from the PC 21 in the process of step S8 in FIG. 6 described above.

In step S33, the license management unit 151 determines whether or not the device information file is valid. Specifically, the license management unit 151 reads the server secret key corresponding to the server public key used for encrypting the device unique key included in the device information file from the storage unit 106. The license management unit 151 decrypts the device unique key using the read server secret key.

Next, the license management unit 151 calculates a hash value of the storage data included in the device information file by using the same hash function as the electronic device 23*a* and the decrypted device unique key. Then, in a case where the calculated hash value matches the hash value in the device information file, the license management unit 151 determines that the device information file is valid, and the processing proceeds to step S34.

Thus, falsification and the like of the device unique ID and the device unique key in the storage data are prevented.

In step S34, the license management unit 151 determines whether or not to transmit the installation request file.

Specifically, the UI control unit 153 generates a display control file for final confirmation of implementation of the license installation. This display control file includes information indicating the remaining period of the license. Note that the remaining period of the license is equal to the maximum valid period of the license because use of the license has not been started yet. The communication unit 103 transmits the display control file to the PC 21 via the network 13 under the control of the communication control unit 154.

Then, in a case where transmission of the installation request file is requested from the PC 21 in step S9 in FIG. 6 described above, the license management unit 151 determines to transmit the installation request file, and the processing proceeds to step S35.

In step S35, the license management unit 151 sets a valid period and a use start date and time of the license. Specifically, since use of the license has not been started yet, the license management unit 151 sets the valid period of the license as the maximum valid period. Furthermore, the license management unit 151 sets the current date and time of the RTC 105 as the use start date and time (hereinafter referred to as a server use start date and time) of the license.

Then, the license management unit 151 responds to return of the license from the electronic device 23*a* and provision of the electronic device (for example, the electronic device 23*b*) with the returned license until the date and time of the RTC 105 pass the set valid period with reference to the set server use start date and time.

In step S36, the license management unit 151 generates an installation key.

FIG. 14 illustrates an example of a format of the installation key.

The installation key includes a function ID, an installation key management ID, a device unique ID, a use start date and time, and a valid period.

The function ID is an ID for identifying a function that is the subject of the license and a valid period.

The installation key management ID is an ID having a data length shorter than that of the installation key and unique to the installation key (different for each installation key). This installation key management ID makes it possible to identify the installation key corresponding to the license of each function.

The device unique ID is a device unique ID of the electronic device 23*a* to which a license is to be provided, and the device unique ID of the electronic device 23*a* included in the device information file is used.

The server use start date and time set in the process of step S35 is set as the use start date and time.

The valid period set in the process of step S35 is set as the valid period.

In step S37, the server 11 stores license management information. The license management unit 151 generates the license management information including, for example, the installation key, the device unique ID, the device unique key, the installation key management ID, the server use start date and time, and the valid period. The storage control unit 155 stores the license management information in the storage unit 106.

In step S38, the data generation unit 152 generates the installation request file.

Specifically, the data generation unit 152 generates storage data including the model name and the device unique ID of the electronic device 23*a*, the function ID of the function that is the subject of the license, the installation key for installing the license, and the installation key management ID corresponding to the installation key.

Next, the data generation unit 152 generates a signature of the storage data using the server secret key. Specifically, the data generation unit 152 calculates the hash value of the storage data using the same hash function as the electronic device 23*a*. Then, the data generation unit 152 generates a signature by encrypting the hash value using the server secret key.

Next, the data generation unit 152 generates an installation request file including the storage data and the signature (encrypted hash value). Thus, security of the storage data is ensured by using the server secret key.

Note that the installation request file is also an installation file used to install the license in the electronic device 23*a*.

In step S39, the communication unit 103 transmits the installation request file to the PC 21 under the control of the communication control unit 154.

Thereafter, the license issuance processing ends.

On the other hand, in step S34, in a case where transmission of the installation request file is not requested from the PC 21 in step S9 in FIG. 6 described above, the license management unit 151 determines not to transmit the installation request file, the processes of steps S35 to S39 are skipped, and the license issuance processing ends. That is, generation of the installation key and transmission of the installation request file are not performed.

Furthermore, in step S33, in a case where the calculated hash value does not match the hash value in the device information file, the license management unit 151 determines that the device information file is not valid, the processes of steps S34 to S39 are skipped, and the license issuance processing ends. That is, generation of the installation key and transmission of the installation request file are not performed.

<License Start Processing>

Next, license start processing executed by the electronic device 23*a* will be described with reference to a flowchart of FIG. 15.

Figure 16:
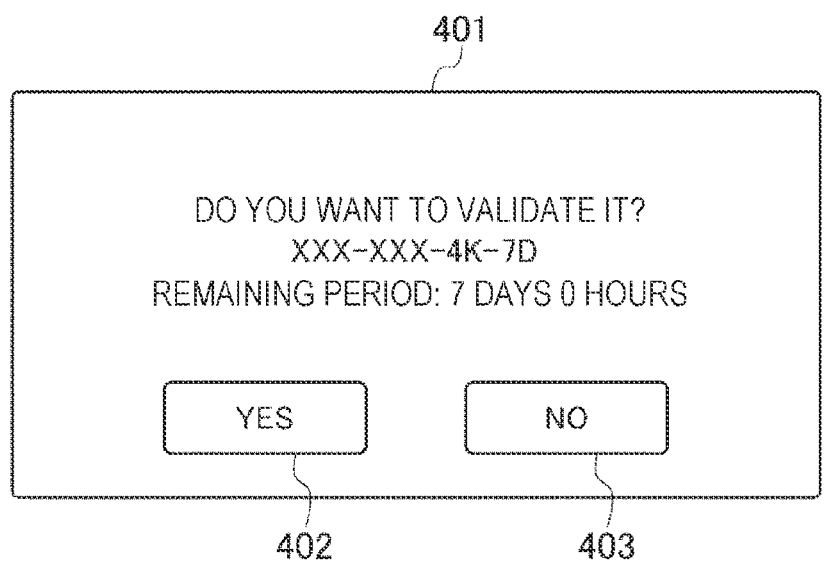
FIG. 16 is a diagram illustrating an example of a screen of the electronic device.

For example, when the medium 22 in which the installation request file is stored in the process of step S11 in FIG. 6 is connected to the drive 208 of the electronic device 23*a*, the output unit 205 displays a window 401 of FIG. 16 under the control of the UI control unit 254.

In the window 401, a model name of the electronic device 23*a*, a function ID, a remaining period of the license, and a message for confirming whether or not to enable the function are displayed. Note that the remaining period of the license is equal to the maximum valid period of the license because use of the license has not been started yet. Furthermore, a YES button 402 and a NO button 403 are displayed in the window 401. Then, in a case where the YES button 402 is pressed, the license start processing is started. On the other hand, in a case where the NO button 403 is pressed, the license start processing is not started.

In step S61, the license management unit 251 determines whether or not the installation request file is valid. Specifically, the license management unit 251 reads the installation request file from the medium 22 via the drive 208. Furthermore, the license management unit 251 reads the server public key from the storage unit 207.

The license management unit 251 decrypts the signature included in the installation request file using the server public key. Thus, the hash value of the storage data included in the installation request file is obtained. Furthermore, the license management unit 251 calculates a hash value of the storage data of the installation request file using the same hash function as that of the server 11. Then, in a case where the calculated hash value matches the hash value in the installation request file, the license management unit 251 determines that the installation request file is valid, and the processing proceeds to step S62.

Thus, falsification and the like of the installation key in the storage data are prevented.

In step S62, the license management unit 251 determines whether or not the device unique ID in the installation key matches that of the own device. In a case where the device unique ID in the installation key matches the device unique ID of the electronic device 23*a* stored in the storage unit 207, the license management unit 251 determines that the device unique ID in the installation key matches the device unique ID of the own device, and the processing proceeds to step S63.

Thus, the license is prevented from being installed using an installation key for another electronic device 23*a*.

In step S63, the license management unit 251 determines whether or not it is an installation key of installation performed in the past. In a case where installation information including an installation key management ID that matches the installation key management ID included in the installation request file is not stored in the storage unit 207, the license management unit 251 determines that the installation key is not an installation key of installation performed in the past, and the processing proceeds to step S64.

Thus, the license is prevented from being doubly installed by using the installation key of installation performed in the past.

In step S64, the license management unit 251 validates the license during the valid period. Specifically, the license management unit 251 sets the current date and time of the RTC 206 as the use start date and time (hereinafter, the client use start date and time) of the license.

Note that the client use start date and time does not necessarily match the server use start date and time set in the server 11. Specifically, a time lag (hereinafter referred to as an installation necessary time) occurs from when the server 11 sets the valid period (maximum valid period) in the process of step S35 in FIG. 13 to when the electronic device 23*b* validates the license in a process of step S264. Therefore, even if the RTC 105 of the server 11 and the RTC 206 of the electronic device 23*a* match, there is a difference between the server use start date and time and the client use start date and time by the installation necessary time.

Then, the license management unit 251 makes the function licensed by the installation key usable until the valid period indicated in the installation key passes on the basis of the client use start date and time.

Therefore, for example, regardless of the installation necessary time, the function corresponding to the license can be used in the electronic device 23*a* during the maximum valid period.

Note that software for achieving the function may be installed in the electronic device 23*a* in advance or may be installed at this time.

In step S65, the electronic device 23*a* stores the license information. For example, the license management unit 251 generates the license information including the installation key, the installation key management ID, the client use start date and time, and the valid period. The storage control unit 256 stores the license information in the storage unit 207.

In step S66, the electronic device 23*a* enables confirmation of the remaining period of the license. For example, in a case where an operation for confirming the remaining period of the license is performed via the input unit 201, the license management unit 151 calculates the remaining period of the license on the basis of the license information.

For example, the remaining period of the license is calculated by following Equation (1).

$$\text{Remaining period of license in electronic device } 23a = \text{valid period} - \text{(date and time of RTC 206} - \text{client use start date and time)} \quad (1)$$

Then, the output unit 205 displays the remaining period of the license under the control of the UI control unit 254.

Thereafter, the license start processing ends.

On the other hand, in step S63, in a case where the installation information including the installation key management ID that matches the installation key management ID included in the installation request file is stored in the storage unit 207, the license management unit 251 determines that the installation key is an installation key of installation performed in the past, and the license start processing ends.

This is assumed to be a case where an attempt is made to install a previously installed license again.

Furthermore, in a case where it is determined in step S62 that the device unique ID in the installation key does not match that of the own device, the license start processing ends.

This is assumed to be, for example, a case where the medium 22 is connected to a different electronic device 23 and an attempt is made to install the license, a case where an incorrect installation request file is received, a case where the installation key is falsified, or the like.

Moreover, in step S61, in a case where the calculated hash value does not match the hash value in the installation request file, the license management unit 251 determines that the installation request file is not valid, and the license start processing ends.

This is assumed to be a case where the installation request file is falsified or the like.

<License Return Processing>

Next, license return processing executed by the client 12 will be described with reference to a flowchart of FIG. 17.

Figure 18:
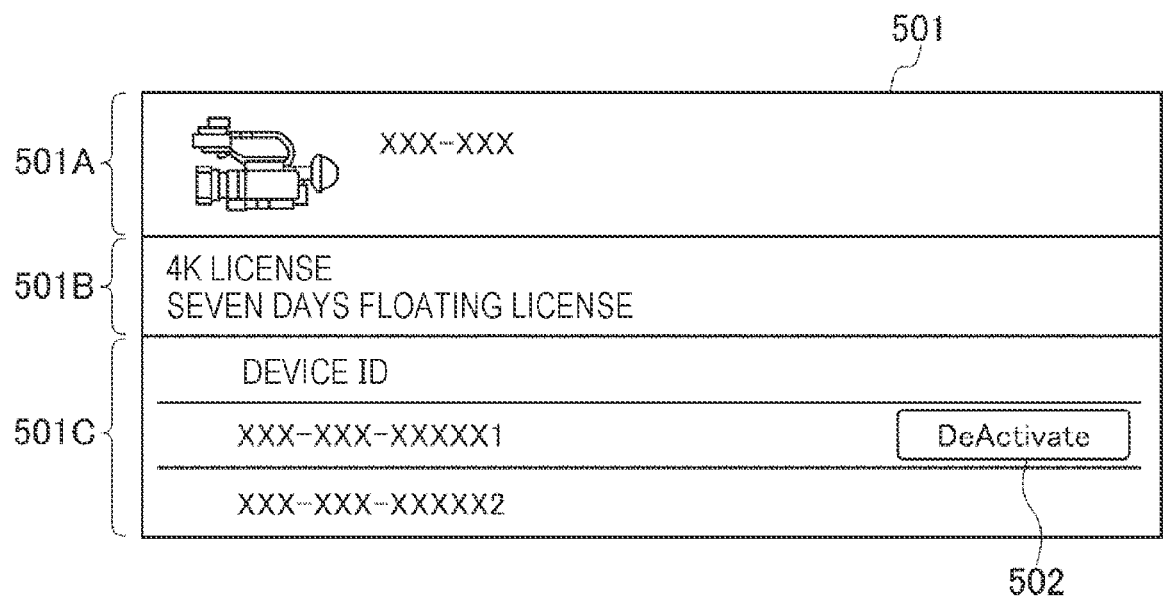
FIG. 18 is a diagram illustrating an example of a screen of the PC.

In step S101, the PC 21 requests a DeActivate request file. For example, the PC 21 accesses the server 11 via the network 13 according to an operation by the user, and displays a screen for returning a license of a function enabled in the electronic device 23a. For example, a window 501 of FIG. 18 is displayed on the screen of the PC 21.

The window 501 is divided into a device information field 501A, a license information field 501B, and a license detailed information field 501C.

At the left end of the device information field 501A, an image and a model name of the electronic device 23 are displayed side by side.

At the left end of the license information field 501B, the function for which a license is to be returned and the type of the license are indicated. In this example, it is indicated that the floating license of the 4K image capturing function with a valid period of seven days is to be returned.

At the left end of the license detailed information field 501C, the device unique ID of the electronic device 23 that can use the function corresponding to the license to be returned among the electronic devices 23 owned by the user is displayed.

Figure 19:
FIG. 19 is a diagram illustrating an example of a screen of the PC.

At the right end of the license detailed information field 501C, a DeActivate button 502 is displayed for the electronic device 23a whose license is currently validated. When the DeActivate 502 is pressed, for example, a window 511 of FIG. 19 is displayed on the screen of the PC 21.

In the window 511, a message prompting to download the DeActivate request file, save the DeActivate request file in the medium 22, and insert the medium 22 into the transfer source device (electronic device 23a), and a download button 512 are displayed. When the download button 512 is pressed, the PC 21 requests the server 11 for the DeActivate request file via the network 13.

Figure 24:
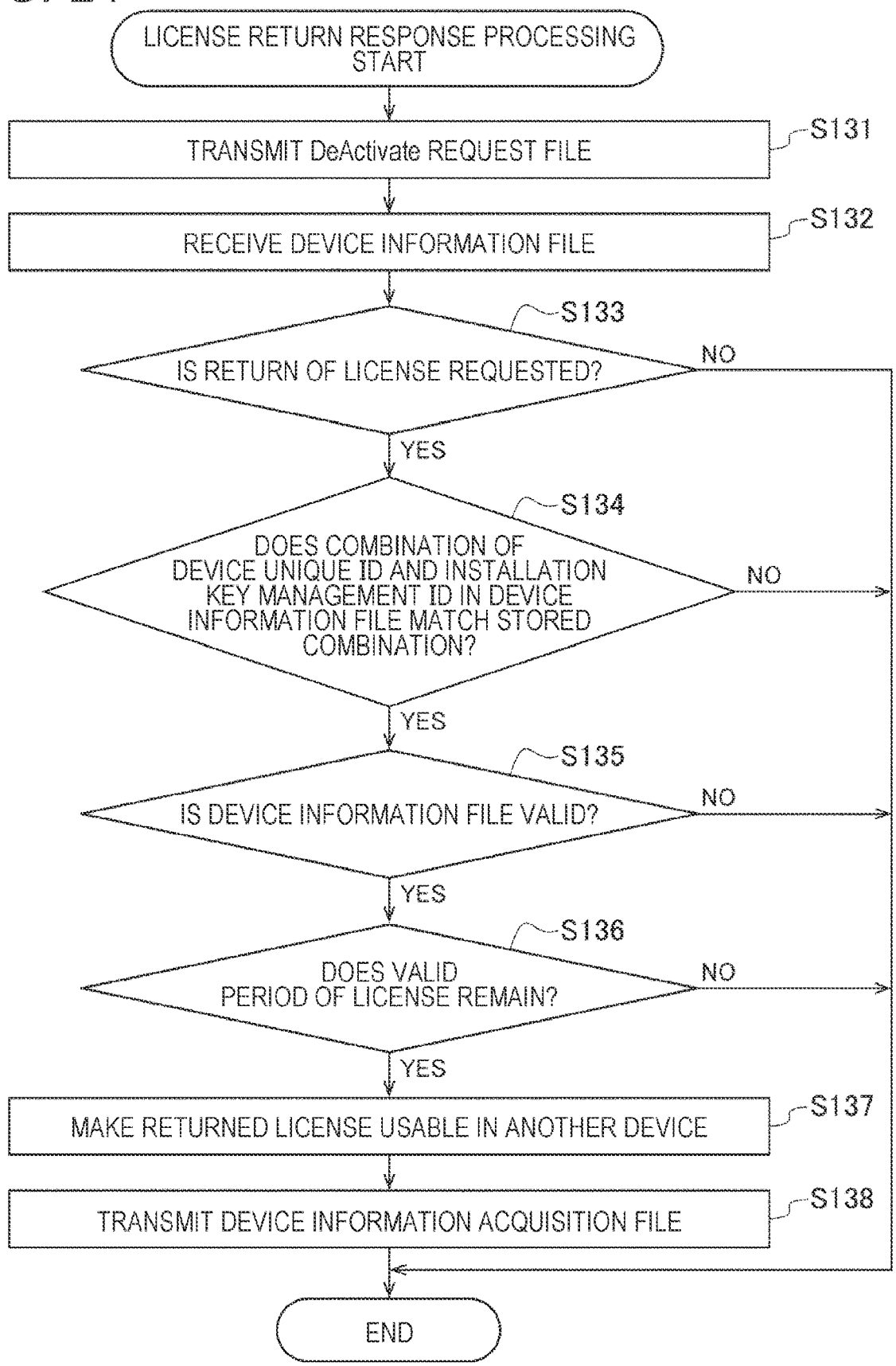
FIG. 24 is a flowchart for explaining license return response processing executed by the server.

In response to this, the server 11 transmits the DeActivate request file to the PC 21 via the network 13 in step S131 in FIG. 24 described later.

In step S102, the PC 21 receives the DeActivate request file transmitted from the server 11. Furthermore, the PC 21 stores the received DeActivate request file in the medium 22, for example, according to an operation by the user.

In step S103, the electronic device 23a executes a command in the DeActivate request file.

Specifically, the user removes the medium 22 storing the DeActivate request file from the PC 21 and connects the medium 22 to the drive 208 of the electronic device 23a.

The drive 208 reads the DeActivate request file stored in the medium 22 and supplies the DeActivate request file to the control unit 203. The control unit 203 executes a DeActivate request command included in the DeActivate request file. Thus, the output unit 205 displays a window 521 of FIG. 20 or a window 531 of FIG. 21, for example, under the control of the UI control unit 254.

In the window 521, the current date and time of the device (electronic device 23a), the model name of the electronic device 23a, the function ID, the valid period of the license, a message indicating that the license is currently valid, and an invalidation button 522 are displayed.

Note that the current date and time of the device is displayed on the basis of the current date and time of the RTC 206 of the electronic device 23a.

On the other hand, the valid period is displayed on the basis of the server use start date and time and the valid period included in the installation key of the license to be returned. Specifically, a period from the server use start date and time to a date and time obtained by adding the valid period to the server use start date and time is displayed as the valid period. That is, this valid period is based on the RTC 105 of the server 11.

Therefore, in a case where the date and time of the RTC 105 of the server 11 does not match the date and time of the RTC 206 of the electronic device 23a, as described in this example, there may be cases where the current date and time of the device displayed in the window 521 are not included in the valid period of the license.

In the window 531, the current date and time of the device (electronic device 23a), the remaining period of the license, the model name of the electronic device 23a, the function ID, the valid period of the license, and an invalidation button 532 are displayed.

Note that the current date and time of the device is displayed on the basis of the current date and time of the RTC 206 of the electronic device 23a. As the remaining period of the license, the period calculated by Equation (1) described above on the basis of the RTC 206 of the electronic device 23a is displayed.

On the other hand, the valid period is displayed on the basis of the server use start date and time and the valid period included in the installation key of the license to be returned. Specifically, a date and time obtained by adding the valid period to the server use start date and time is displayed as the valid period. That is, this valid period is based on the RTC 105 of the server 11.

Therefore, in a case where the date and time of the RTC 105 of the server 11 does not match the date and time of the RTC 206 of the electronic device 23a, as described in this example, there may be a case where the relationship between the current date and time of the device and the remaining period of the license and the valid period displayed in the window 521 does not match.

Figure 20:
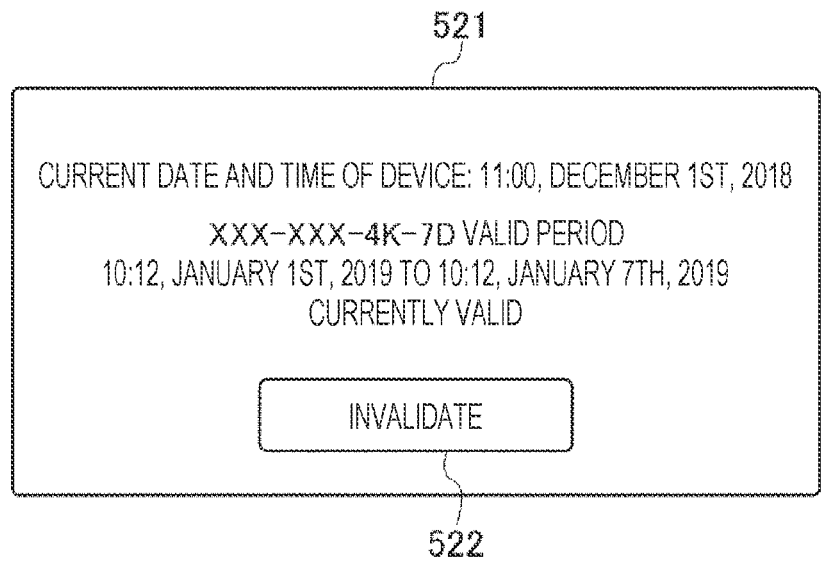
FIG. 20 is a diagram illustrating an example of a screen of the electronic device.
Figure 21:
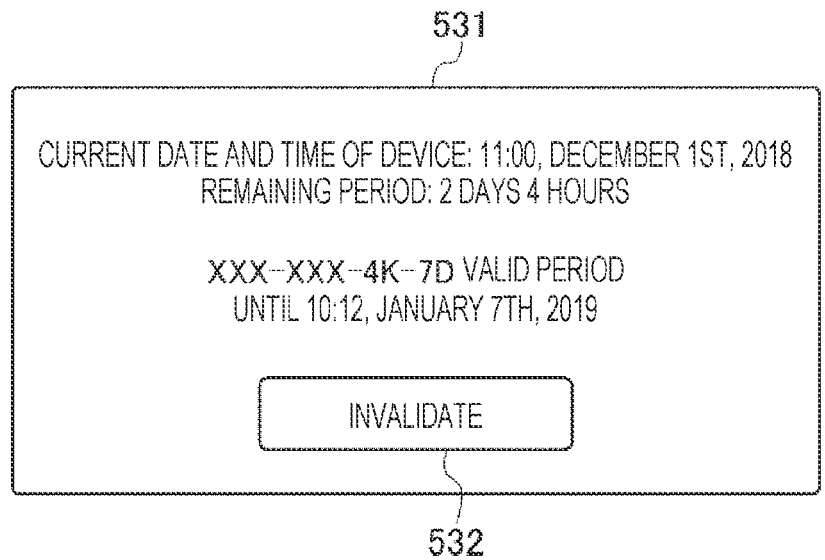
FIG. 21 is a diagram illustrating an example of a screen of the electronic device.
Figure 22:
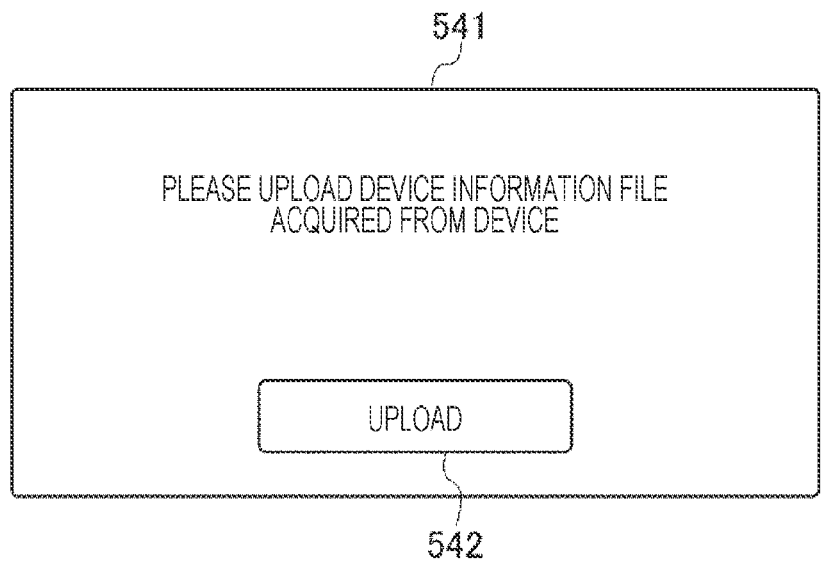
FIG. 22 is a diagram illustrating an example of a screen of the PC.

Note that, for example, the processes of steps S101 to S103 may be omitted, the user may operate the electronic device 23a without using the DeActivate request command to thereby display the window 521 of FIG. 20 or the window 531 of FIG. 21 on the electronic device 23a, and start the license return processing.

In step S104, the license management unit 251 invalidates the license.

For example, the user presses the invalidation button 522 of the window 521 of FIG. 20 or the invalidation button 532 of the window 531 of FIG. 21. Then, when the invalidation of the license is determined, the license management unit 251 makes the function unusable.

In step S105, the data generation unit 253 generates the device information file.

Specifically, the data generation unit 253 encrypts the device unique key with the server public key, similarly to the process of step S6 in FIG. 6.

Furthermore, the data generation unit 253 reads the firmware version, the device unique ID, and the installation key management ID of the license to be returned from the storage unit 207. The data generation unit 253 generates storage data including the model name of the electronic device 23a, the firmware version, the device unique ID, the encrypted device unique key, the installation key management ID, and the information indicating that the license (corresponding to the installation key management ID) is to be returned.

Moreover, the data generation unit 253 calculates a hash value of the storage data using the device unique key, and generates the device information file including the storage data and the hash value, similarly to the process of step S6 in FIG. 6.

Information included in the device information file is used for returning the license in the server 11 as license return information for returning the license.

In step S106, the device information file is stored in the medium 22 similarly to the process of step S7 in FIG. 6.

In step S107, the PC 21 transmits the device information file to the server 11.

For example, the user removes the medium 22 from the electronic device 23a and connects to the PC 21. For example, the PC 21 displays a window 541 of FIG. 22 on the screen.

A message prompting to upload the device information file acquired from the device (electronic device 23a) and an upload button 542 are displayed in the window 541. When the upload button 542 is pressed, the PC 21 reads the device information file from the medium 22 and transmits the device information file to the server 11 via the network 13.

In step S108, the PC 21 determines whether or not the DeActivate has been completed. In a case where the device information acquisition file transmitted from the server 11 has been received in step S138 in FIG. 24 described later, the PC 21 determines that the DeActivate has been completed, and the processing proceeds to step S109.

In step S109, the PC 21 notifies the return completion of the license. For example, the PC 21 displays a window 551 of FIG. 23 on the screen.

In the window 551, a message notifying that the DeActivate has been completed, the remaining period of the license, a message prompting for saving the device information acquisition file in the medium 22 and inserting the medium 22 into the transfer destination device (electronic device 23b), and an OK button 552 are displayed. When the OK button 552 is pressed, the window 541 is closed.

Note that the remaining period of the license displayed in the window 551 is calculated on the basis of the current date and time of the RTC 105 of the server 11 as described later. Therefore, as described later, a difference occurs between the remaining period displayed in the window 531 of FIG. 21 and the remaining period displayed in the window 551.

Thereafter, the license return processing ends.

On the other hand, in step S108, in a case where the device information acquisition file has not been received from the server 11, the PC 21 determines that the DeActivate has not been completed, the process of step S109 is skipped, and the license return processing ends.

<License return response processing>

Next, license return response processing executed by the server 11 in response to the license return processing by the client 12 of FIG. 17 will be described with reference to a flowchart of FIG. 24.

Figure 17:
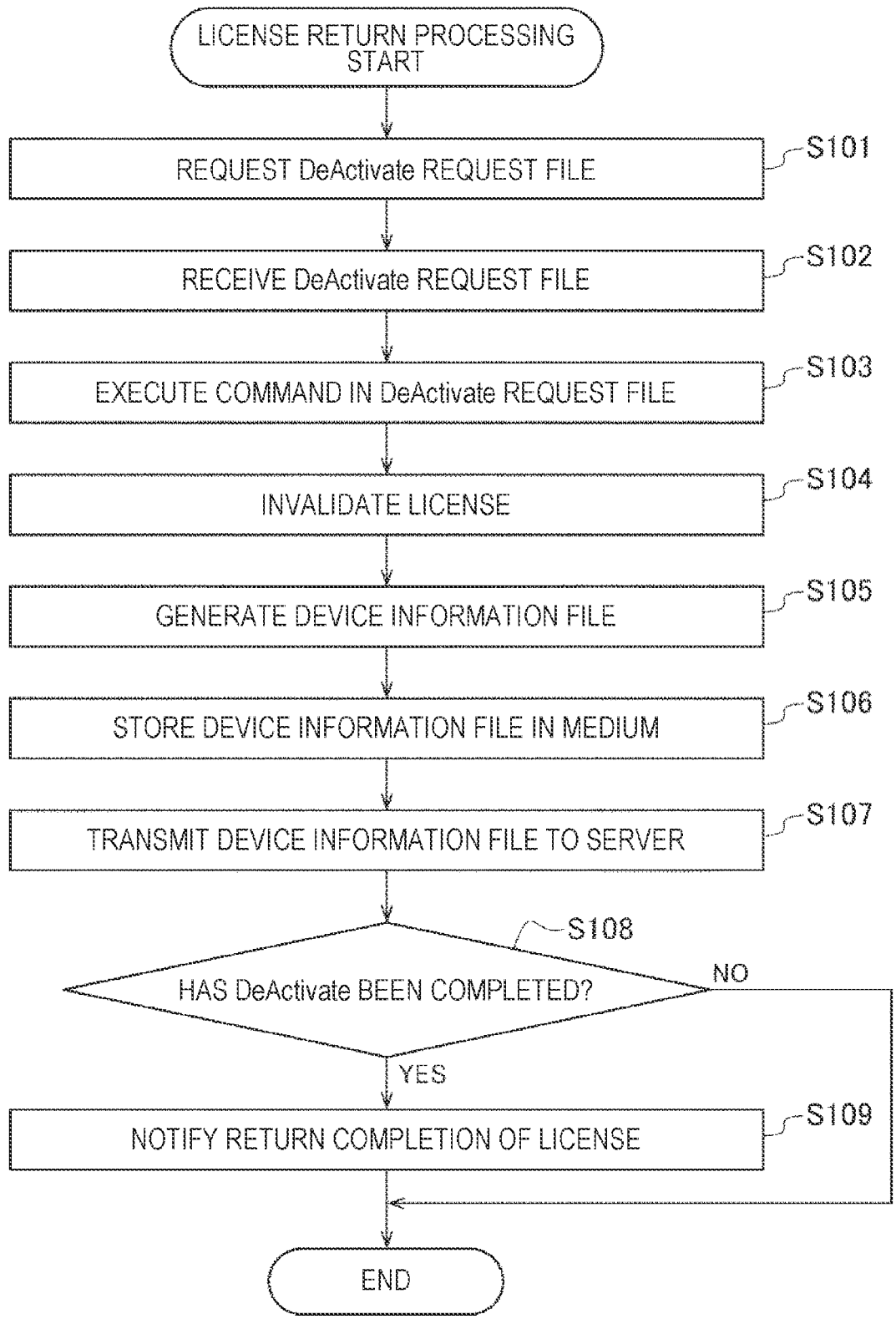
FIG. 17 is a flowchart for explaining license return processing executed by the client.

Note that this processing is started, for example, when the server 11 is requested for the DeActivate request file from the PC 21 in step S101 in FIG. 17 described above.

In step S131, the server 11 transmits the DeActivate request file. Specifically, the data generation unit 152 generates the DeActivate request file including a DeActivate request file command. The communication unit 103 transmits the DeActivate request file to the PC 21 via the network 13 under the control of the communication control unit 154.

Note that, by omitting the processes of steps S101 to S103 in FIG. 17 of the electronic device 23a as described above, the process of step S131 can be omitted.

In step S132, the server 11 receives the device information file. Specifically, the communication control unit 154 receives, via the communication unit 103, the device information file transmitted from the PC 21 in the process of step S107 in FIG. 17 described above.

In step S133, the license management unit 151 determines whether or not return of a license is requested. In a case where the received device information file includes information indicating that the license is to be returned, the license management unit 151 determines that the license is requested to be returned, and the processing proceeds to step S134.

In step S134, the license management unit 151 determines whether or not a combination of the device unique ID and the installation key management ID in the device information file matches a stored combination. Specifically, the license management unit 151 searches the license management information stored in the storage unit 106 for the license management information in which the combination of the device unique ID and the installation key management ID matches the combination in the device information file. Then, in a case where the corresponding license management information is detected, the license management unit 151 determines that the combination of the device unique ID and the installation key management ID in the device information file matches the stored combination, and the processing proceeds to step S135.

In step S135, the license management unit 151 determines whether or not the device information file is valid. Specifically, the license management unit 151 reads the device unique key included in the license management information detected in the process of step S134 from the storage unit 106.

The license management unit 151 calculates a hash value of the storage data included in the device information file by using the same hash function as the electronic device 23a and the read device unique key. Then, in a case where the calculated hash value matches the hash value in the device information file, the license management unit 151 determines that the device information file is valid, and the processing proceeds to step S136.

Thus, falsification and the like of the device unique ID and the installation key management ID in the storage data are prevented.

Furthermore, it is thus guaranteed that the combination of the device unique key used to calculate the hash value in the device information file, and (the installation key corresponding to) the installation key management ID and the device unique ID in the device information file matches the combination of the device unique key, (the installation key corresponding to) the installation key management ID, and the device unique ID stored in the storage unit 106.

In step S136, the license management unit 151 determines whether or not the valid period of the license remains. Specifically, the license management unit 151 calculates the remaining period of the license by following Equation (2) on the basis of the valid period and the server use start date and time in the license management information detected in the process of step S134.

$$\text{Remaining period of license in server } 11 = \text{valid period} - (\text{date and time of } RTC\ 105 - \text{server use start date and time}) \quad (2)$$

In a case where the calculated remaining period is greater than zero, the license management unit 151 determines that the valid period of the license remains, and the processing proceeds to step S137.

In step S137, the license management unit 151 makes the returned license usable. For example, the license management unit 151 updates the license management information detected in the process of step S134 by adding information indicating that return and invalidation have been done, and stores the updated license management information in the storage unit 106. Furthermore, for example, the license management unit 151 causes the storage unit 106 to store information indicating that the installation key of the returned license can be issued again.

In step S138, the server 11 transmits the device information acquisition file. Specifically, the data generation unit 152 generates the device information acquisition file including the information indicating the remaining period of the license calculated in the process of step S136 and the device information acquisition command. This remaining period is displayed in the window 551 of FIG. 23 described above. The communication unit 103 transmits the device information acquisition file to the PC 21 via the network 13 under control of the communication control unit 154.

Thereafter, the license return response processing ends.

Here, the remaining period of the license displayed in the window 531 of FIG. 21 described above is calculated by Equation (1) described above. That is, this remaining period is calculated on the basis of the date and time of the RTC 206 of the electronic device 23a with reference to the date and time when the license is validated in the electronic device 23a (client use start date and time).

Figure 23:
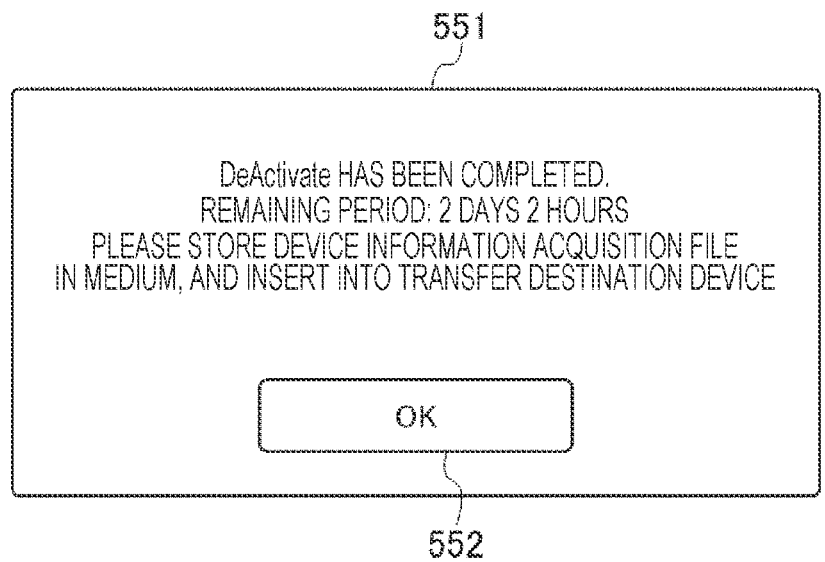
FIG. 23 is a diagram illustrating an example of a screen of the PC.

On the other hand, the remaining period of the license displayed in the window 551 of FIG. 23 is calculated by Equation (2). That is, this remaining period is calculated on the basis of the date and time of the RTC 105 of the server 11 with reference to the date and time when the valid period of the license is set in the server 11 (server use start date and time).

Therefore, a time difference occurs between the two remaining periods. Specifically, the remaining period displayed in the window 551 is shorter as compared to the remaining period displayed in the window 531 by the time obtained by adding a necessary time from when the window 531 is displayed to when the window 551 is displayed to a necessary installation time.

Note that the necessary time from when the window 531 is displayed to when the window 551 is displayed is substantially equal to a necessary time from when the license in the electronic device 23a is invalidated to when the device information file for returning the license to the server 11 is transmitted (hereinafter referred to as a license return necessary time). Therefore, for example, in a case where the installation necessary time is one hour and the license return necessary time is one hour, the time difference between the both remaining periods is approximately two hours.

On the other hand, in step S136, in a case where the calculated remaining period of the license is zero or less, the license management unit 151 determines that the valid period of the license does not remain, the processes of steps S137 and S138 are skipped, and the license return response processing ends. That is, although the license is returned, since the valid period has already passed, the license is invalidated as it is.

Furthermore, in step S135, in a case where the calculated hash value does not match the hash value in the device information file, the license management unit 151 determines that the device information file is not valid, the license is invalidated without accepting the return of the license, and the license return response processing ends.

Moreover, in step S134, in a case where the corresponding license management information cannot be detected, the license management unit 151 determines that the combination of the device unique ID and the installation key in the device information file does not match the stored combination, the license is invalidated without accepting the return of the license, and the license return response processing ends.

Furthermore, in step S133, in a case where the received device information file does not include the information indicating that the license is to be returned, the license management unit 151 determines that the return of the license is not requested, the processes of steps S134 to S138 are skipped, and the license return response processing ends.

<License Reacquisition Processing>

Next, license reacquisition processing executed by the client 12 will be described with reference to a flowchart of FIG. 25.

In step S201, the electronic device 23b executes a command in the device information acquisition file.

Specifically, the user removes the medium 22 storing the device information acquisition file acquired in the process of step S109 in FIG. 17 from the PC 21, and connects the medium 22 to the drive 208 of the electronic device 23b.

The drive 208 reads the device information acquisition file stored in the medium 22 and supplies the device information acquisition file to the control unit 203. The control unit 203 executes a device information acquisition command included in the device information acquisition file. Thus, acquisition processing of device information is started.

Note that, for example, the process of step S201 may be omitted, and the acquisition processing of the device information may be started by the user operating the electronic device 23b without using the device information acquisition command.

In step S202, similarly to the process of step S4 in FIG. 6, it is determined whether or not the device unique key has been generated. In a case where it is determined that the device unique key has not been generated, the processing proceeds to step S203.

In step S203, the device unique key is generated similarly to the process of step S5 in FIG. 6.

Thereafter, the processing proceeds to step S204.

On the other hand, in a case where it is determined in step S202 that the device unique key has been generated, the process of step S203 is skipped, and the processing proceeds to step S204.

In step S204, the device information file is generated similarly to the process of step S6 in FIG. 6.

In step S205, the device information file is stored in the medium 22 similarly to the process of step S7 in FIG. 6.

In step S206, the device information file is transmitted to the server 11 similarly to the process of step S8 in FIG. 6.

On the other hand, the server 11 receives the device information file in step S231 in FIG. 28 described later.

In step S207, the PC 21 determines whether or not to acquire the installation request file.

In a case where it is determined that the device information file received from the PC 21 is valid, the server 11 transmits the display control file for final confirmation of implementation of the license installation via the network 13 in step S234 in FIG. 28 described later.

Figure 26:
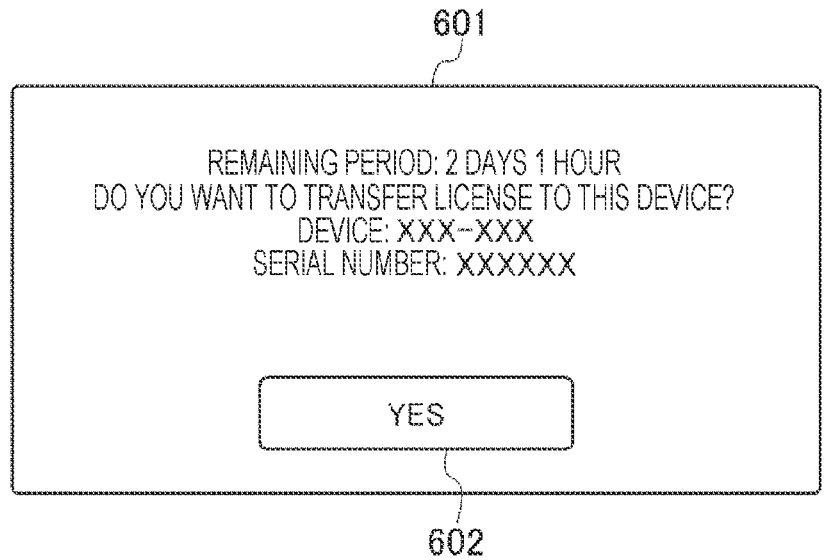
FIG. 26 is a diagram illustrating an example of a screen of the PC.

The PC 21 displays a window 601 of FIG. 26 on the screen on the basis of the display control file.

Figure 27:
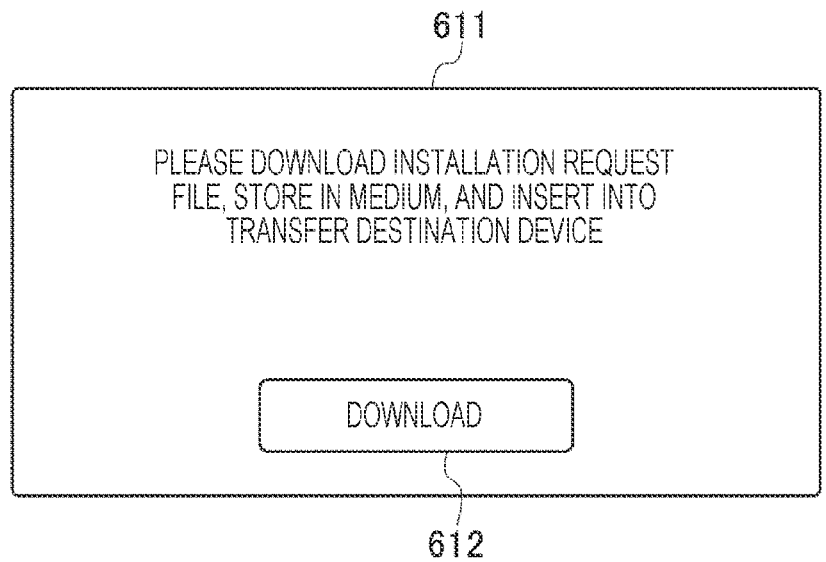
FIG. 27 is a diagram illustrating an example of a screen of the PC.

In the window 601, the remaining period of the license, a message asking whether or not to transfer the license for the device (the electronic device 23b), a model name of the electronic device 23b, a serial number of the electronic device 23b, and a YES button 602 are displayed. When the YES button 602 is pressed, for example, a window 611 of FIG. 27 is displayed on the screen of the PC 21.

Note that, as described later, the remaining period calculated on the basis of the RTC 105 in the server 11 is displayed as the remaining period of the license of the window 601.

In the window 611, a message prompting to download the installation request file, save the installation request file in the medium 22, and insert the medium 22 into the transfer destination device (electronic device 23b), and a download button 612 are displayed. Then, when the download button 612 is pressed, the PC 21 determines to acquire the installation request file, and requests the server 11 to transmit the installation request file via the network 13. Thereafter, the processing proceeds to step S208.

In response to this, the server 11 transmits the installation request file including the installation key and the like in step S239 in FIG. 28 described later.

In step S208, the installation request file is received similarly to the process of step S10 in FIG. 6.

In step S209, the installation request file is stored in the medium 22 similarly to the process of step S11 in FIG. 6.

Thereafter, the license reacquisition processing ends.

On the other hand, in step S207, in a case where the display control file for final confirmation of implementation of the license installation has not been received, or in a case where acquisition of the installation request file has not been instructed, the PC 21 determines not to acquire the installation request file. Thereafter, the processes of steps S208 and S209 are skipped, the installation request file is not acquired, and the license reacquisition processing ends.

<License reissuance processing>

Next, license reissuance processing executed by the server 11 in response to the license reacquisition processing by the client 12 of FIG. 25 will be described with reference to a flowchart of FIG. 28.

Figure 13:
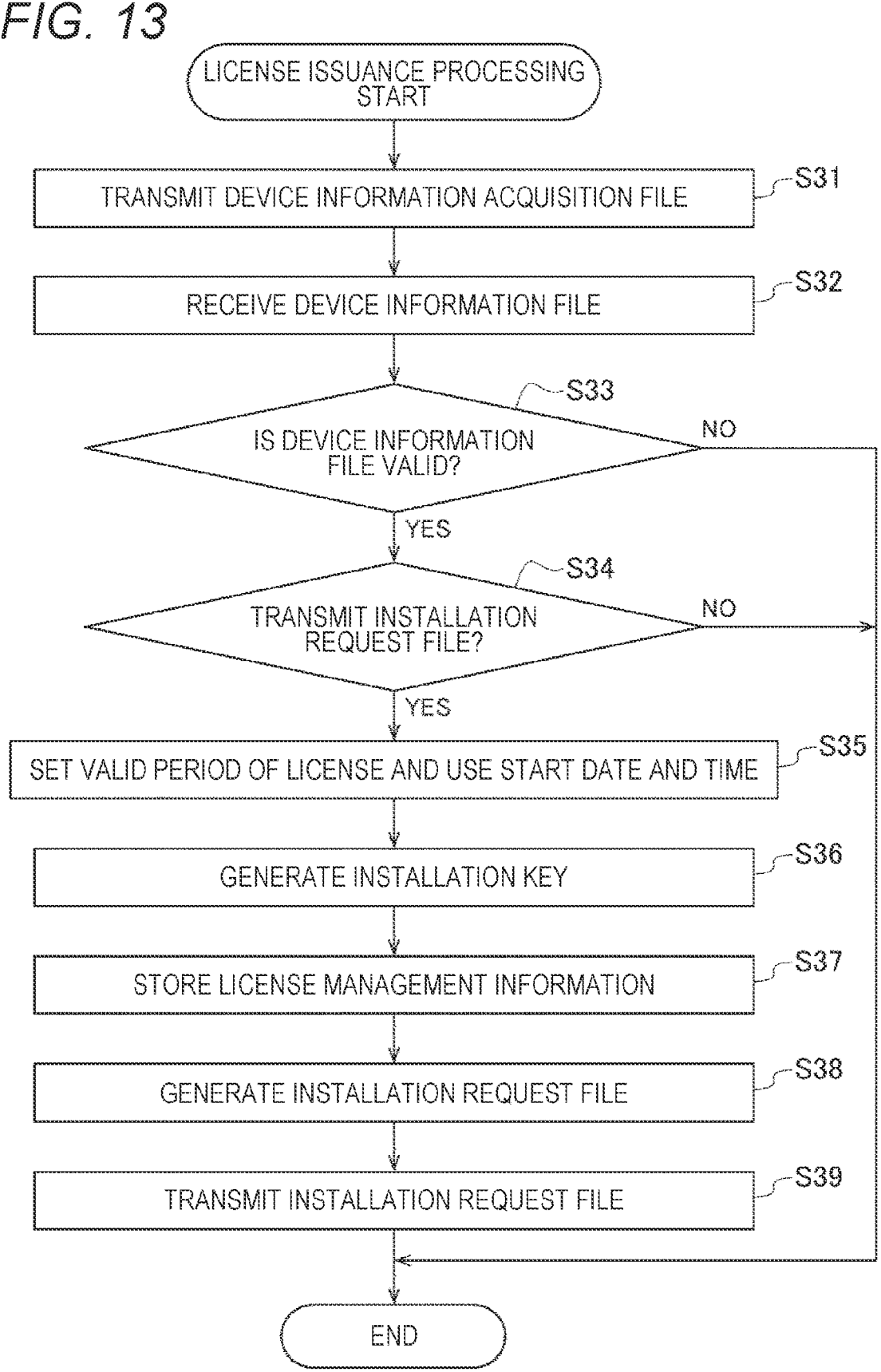
FIG. 13 is a flowchart for explaining license issuance processing executed by the server.
Figure 25:
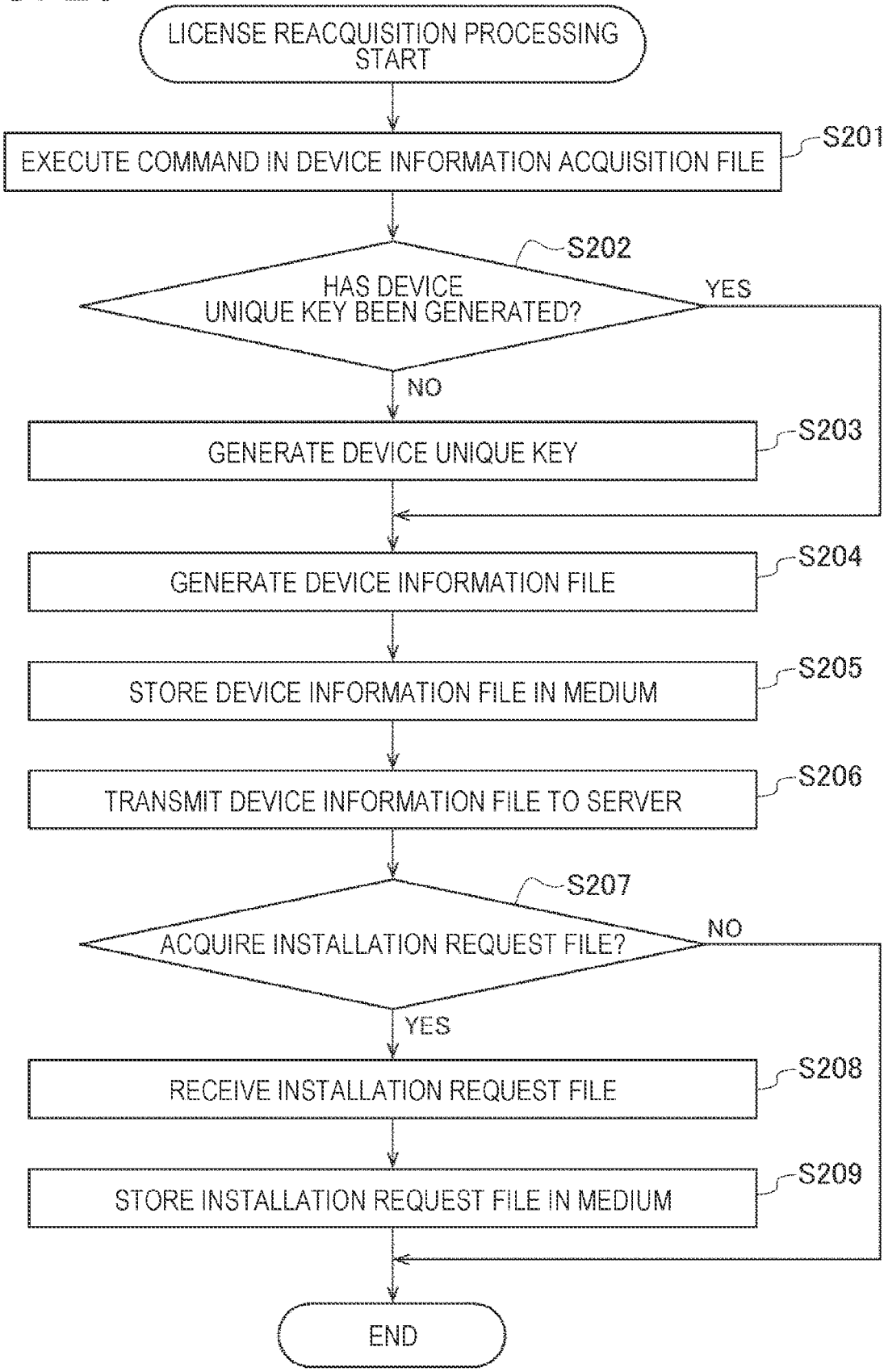
FIG. 25 is a flowchart for explaining license reacquisition processing executed by the client.

In step S231, similarly to the process of step S32 in FIG. 13, the communication control unit 154 of the server 11 receives, via the communication unit 103, the device information file transmitted from the PC 21 in the process of step S206 in FIG. 25 described above.

In step S232, similarly to the process of step S33 in FIG. 13, it is determined whether or not the device information file is valid. In a case where it is determined that the device information file is valid, the processing proceeds to step S233.

In step S233, the license management unit 151 determines whether or not the valid period of the license remains. Specifically, the license management unit 151 reads, from the storage unit 106, the license management information immediately before the license is returned, that is, the license management information stored when the installation key is generated for the electronic device 23a. Then, the license management unit 151 calculates the remaining period of the license by above-described Equation (2) on the basis of the valid period and the server use start date and time in the read license management information. In a case where the calculated remaining period is greater than zero, the license management unit 151 determines that the valid period of the license remains, and the processing proceeds to step S234.

In step S234, the license management unit 151 determines whether or not to transmit the installation request file.

Specifically, the UI control unit 153 generates the display control file for final confirmation of implementation of the license installation. This display control file includes information indicating the remaining period of the license calculated in the process of step S233. This remaining period is displayed in the window 601 of FIG. 26 described above.

Here, a time difference occurs between the remaining period displayed in the window 551 and the remaining period displayed in the window 601 by a necessary time from when the window 551 of FIG. 23 is displayed to when the window 601 of FIG. 26 is displayed. This time difference is substantially equal to the necessary time from when the license is returned to when the returned license is acquired again.

The communication unit 103 transmits the display control file to the PC 21 via the network 13 under the control of the communication control unit 154.

Then, in a case where transmission of the installation request file is requested from the PC 21 in step S207 in FIG. 25 described above, the license management unit 151 determines to transmit the installation request file, and the processing proceeds to step S235.

In step S235, the license management unit 151 sets the valid period and the use start date and time of the license. Specifically, the license management unit 151 calculates the remaining period of the license by above-described Equation (2), and sets the calculated remaining period as a new valid period of the license. Furthermore, the license management unit 151 sets the current date and time of the RTC 105 as a new use start date and time (server use start date and time) of the license.

Here, the date and time of the RTC 105 in Equation (2) are equal to the new server use start date and time, and the server use start date and time in Equation (2) are equal to the server use start date and time before the update when it is provided to the electronic device 23a. Therefore, the new valid period of the license is equal to the remaining period of the valid period of the license with reference to the new server use start date and time.

Then, the license management unit 151 responds to return of the license from the electronic device 23b and provision of the electronic device (for example, the electronic device 23a) with the returned license until the date and time of the RTC 105 pass the new valid period with reference to the new server use start date and time.

Note that the remaining period of the license calculated in the process of step S234 may be set as it is as a new valid period.

In step S236, the license management unit 151 generates an installation key. That is, the license management unit 151 generates the installation key in the format of FIG. 14 described above.

Note that the installation key has the same function ID as that of the installation key for the electronic device 23a generated in the process of step S36 in FIG. 13, and has an installation key management ID, a device unique ID, a use start date and time, and a valid period different from those thereof.

Specifically, a new installation key management ID is generated and set in the installation key.

As the device unique ID, the device unique ID of the electronic device 23b is set, the device unique ID of the electronic device 23b being included in the device information file.

As the use start date and time, the server use start date and time set in the process of step S235 is set.

As the valid period, the valid period set in the process of step S235 is set.

In step S237, the license management information is generated and stored similarly to the process of step S37 in FIG. 13.

In step S238, the installation request file is generated similarly to the process of step S38 in FIG. 13.

In step S239, the installation request file is transmitted similarly to the process of step S39 in FIG. 13.

Thereafter, the license reissuance processing ends.

On the other hand, in a case where it is determined in step S234 not to transmit the installation request file, the processes of steps S235 to S239 are skipped, and the license reissuance processing ends. That is, generation of the installation key and transmission of the installation request file are not performed.

Furthermore, in step S233, in a case where the calculated remaining period of the license is zero or less, the license management unit 151 determines that the valid period of the license does not remain, the processes of steps S234 and S239 are skipped, and the license reissuance processing ends. That is, since the valid period of the license has already passed, generation of the installation key and transmission of the installation request file are not performed.

Moreover, in a case where it is determined in step S232 that the device information file is not valid, the processes of steps S233 to S239 are skipped, and the license reissuance processing ends. That is, generation of the installation key and transmission of the installation request file are not performed.

<License Transfer Processing>

Figure 29:
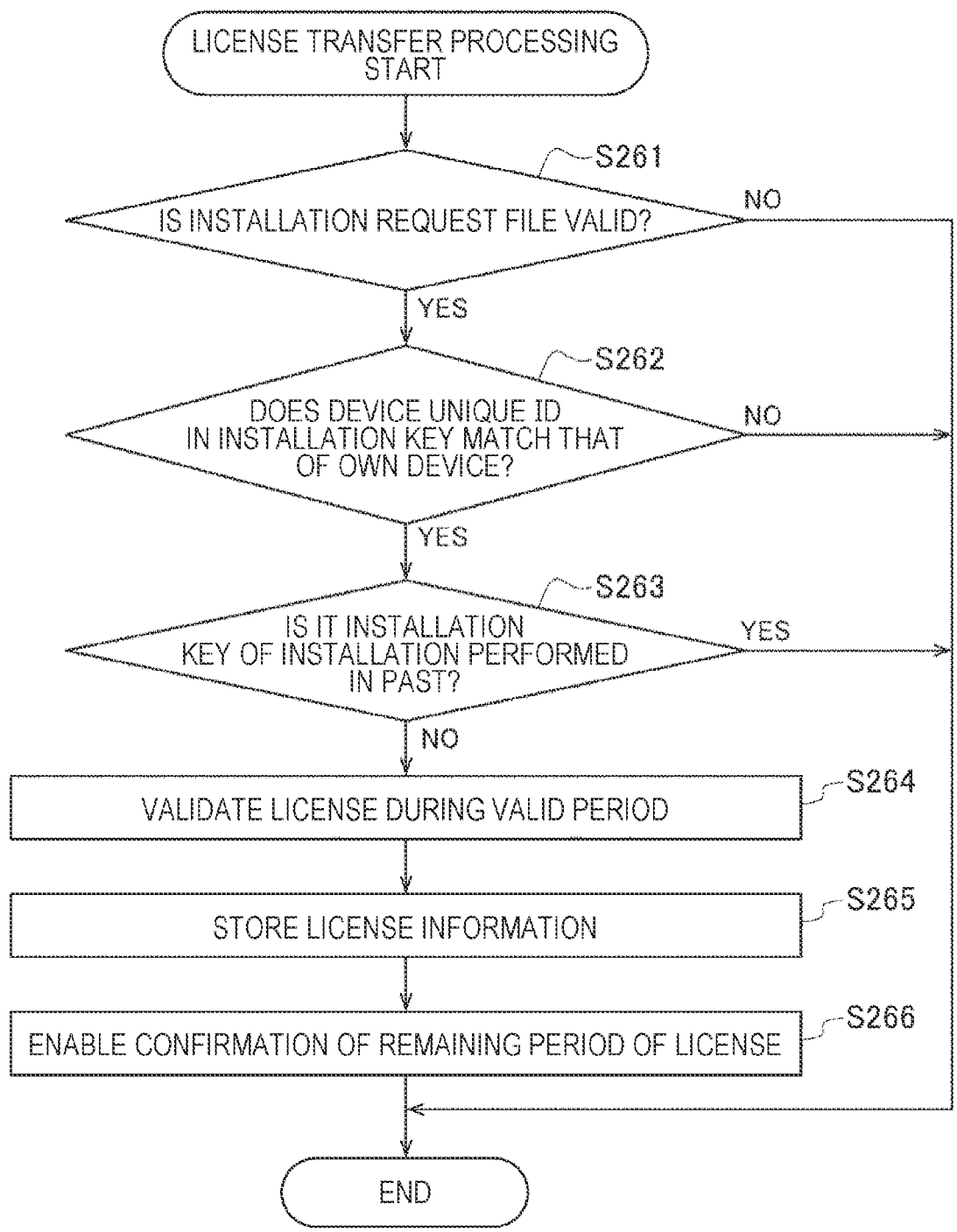
FIG. 29 is a flowchart for explaining license transfer processing executed by the electronic device.

Next, license transfer processing executed by the electronic device 23b will be described with reference to a flowchart of FIG. 29.

Figure 30:
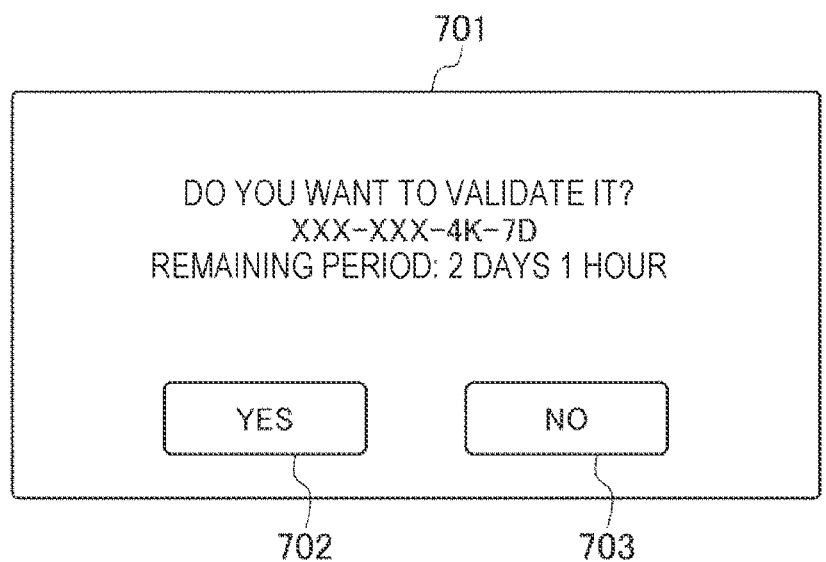
FIG. 30 is a diagram illustrating an example of a screen of the electronic device.

For example, when the medium 22 in which the installation request file is stored in the process of step S209 in FIG. 25 is connected to the drive 208 of the electronic device 23b, the output unit 205 displays a window 701 of FIG. 30 under the control of the UI control unit 254.

In the window 701, the model name of the electronic device 23b, the function ID, the remaining period of the license, and a message for confirming whether or not to enable the function are displayed. Note that in the remaining period of the license, the valid period of the license set in the installation key is displayed. Furthermore, a YES button 702 and a NO button 703 are displayed in the window 701. Then, in a case where the YES button 702 is pressed, the license transfer processing is started. On the other hand, in a case where the NO button 703 is pressed, the license transfer processing is not started.

In step S261, it is determined whether or not the installation request file is valid, similarly to the process of step S61 in FIG. 15. In a case where it is determined that the installation request file is valid, the processing proceeds to step S262.

In step S262, it is determined whether or not the device unique ID in the installation key matches that of the own device, similarly to the process of step S62 in FIG. 15. In a case where it is determined that the device unique ID in the installation key matches that of the own device, the processing proceeds to step S263.

In step S263, it is determined whether or not the installation key is an installation key of installation performed in the past, similarly to the process of step S63 in FIG. 15. In a case where it is determined that the installation key is not the installation key of installation performed in the past, the processing proceeds to step S264.

In step S264, the license management unit 251 validates the license during the valid period. Specifically, the license management unit 251 sets the current date and time of the RTC 206 as the use start date and time (client use start date and time) of the license. Then, the license management unit 251 makes the function licensed by the installation key usable until the valid period indicated in the installation key passes on the basis of the client use start date and time.

Figure 28:
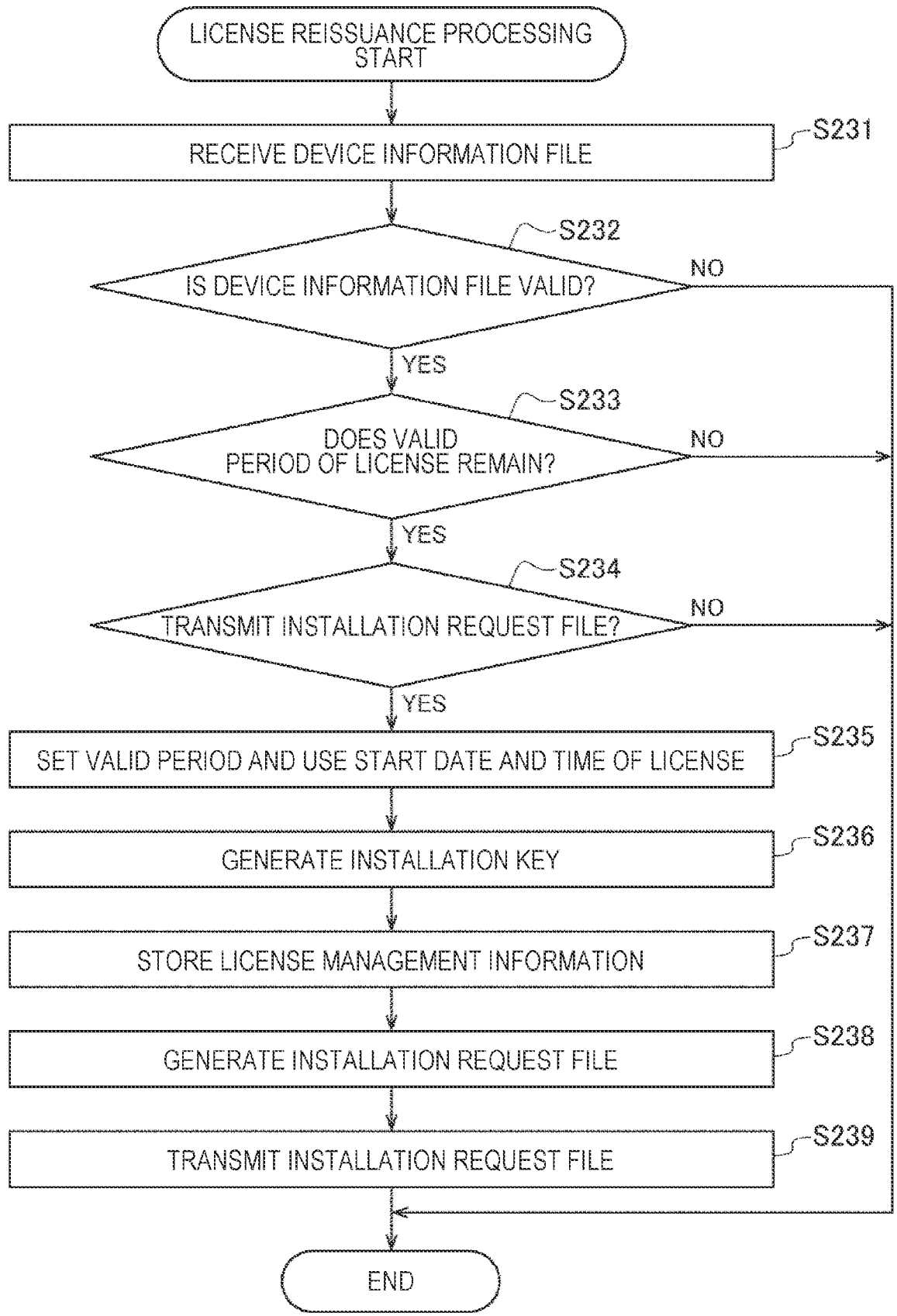
FIG. 28 is a flowchart for explaining license reissuance processing executed by the server.

Therefore, for example, regardless of the time passed from when the server 11 sets the valid period (remaining period) of the license in the process of step S235 in FIG. 28 to when the electronic device 23b validates the license in the process of step S264, the function corresponding to the license can be used in the electronic device 23b during the valid period set in the process of step S235.

In step S265, the license information is stored similarly to the process of step S65 in FIG. 15.

In step S266, confirmation of the remaining period of the license is enabled similarly to the process of step S66 in FIG. 15.

Thereafter, the license transfer processing ends.

On the other hand, in a case where it is determined in step S261 that the installation request file is not valid, in a case where it is determined in step S262 that the device unique ID in the installation key does not match that of the own device, or in a case where it is determined in step S263 that it is the installation key of installation performed in the past, the license is not validated and the license transfer processing ends.

As described above, even if the server 11 and the electronic device 23 do not directly communicate with each other, the time-limited floating license provided by the server 11 can be shared and used by the plurality of electronic devices 23 during the valid period.

Furthermore, even if the server 11 and the electronic device 23 do not directly communicate with each other, it is possible to install a license in the electronic device 23 in a safe state, and make the function of the electronic device 23 usable.

Moreover, even if the server 11 and the electronic device 23 do not directly communicate with each other, it is possible to return the license from the electronic device 23 to the server 11 in a safe state, and make the license usable in another electronic device 23.

Furthermore, it is possible to return the license by one-way processing of only transmitting the device information file from the electronic device 23 to the server 11 via the medium 22 and the PC 21, and it is possible to reduce processing necessary for returning the license. Furthermore, even if the RTC 105 of the server 11 and the RTC 206 of the electronic device 23 are not combined, the time-limited floating license provided by the server 11 can be reliably shared and used by the plurality of electronic devices 23 during the valid period. That is, convenience in a case where the electronic device 23 uses the time-limited floating license is improved.

Moreover, different device unique keys are generated in electronic devices 23, and security of each communication path between the electronic devices 23 and the server 11 is ensured by the device unique keys different from each other. Therefore, even if the device unique key of one electronic device 23 is hacked, the floating license can be safely used in other electronic devices 23 without affecting the other electronic devices 23.

2. Modification Examples

Hereinafter, modification examples of the above-described embodiment of the present technology will be described.

In the above description, an example is given in which the electronic device 23a and the electronic device 23b share the same PC 21, but PCs 21 different from each other may be used. Furthermore, the electronic device 23a may use different PCs 21 between when the license is acquired from the server 11 and when the license is returned.

Moreover, for example, instead of the PC 21, another information processing device (for example, a smartphone, a tablet, or the like) that can communicate with the server 11 and can read and write the medium 22 may be used.

Furthermore, for example, the server 11 and the electronic device 23 may exchange data not via the medium 22 but via another information processing device (for example, a smartphone, a tablet, or the like).

FIGS. 31A, 31B, 31C, 32A, and 32C illustrate an example of a case where the server 11 and the electronic device 23 exchange data via a smartphone 801.

For example, the server 11 and the smartphone 801 perform communication (hereinafter, referred to as 4G communication) based on a fourth generation (4G) mobile communication standard. The electronic device 23 and the smartphone 801 communicate with each other via Wi-Fi.

In this case, since the smartphone 801 cannot simultaneously perform the 4G communication and the Wi-Fi communication, exchange of data is performed in order similarly to the case of using the medium 22 described above.

Specifically, for example, as illustrated in FIGS. 31A, 31B, and 31C, first, the electronic device 23 and the smartphone 801 are connected by Wi-Fi, and the electronic device 23 transmits the device information file to the smartphone 801.

Next, the server 11 and the smartphone 801 are connected by the 4G communication, and the smartphone 801 transmits the device information file to the server 11. The server 11 generates the installation request file using the received device information file and transmits the installation request file to the smartphone 801.

Next, the electronic device 23 and the smartphone 801 are reconnected by Wi-Fi, and the smartphone 801 transmits the installation request file to the electronic device 23. Then, the electronic device 23 installs the license using the installation request file.

Figure 32A:
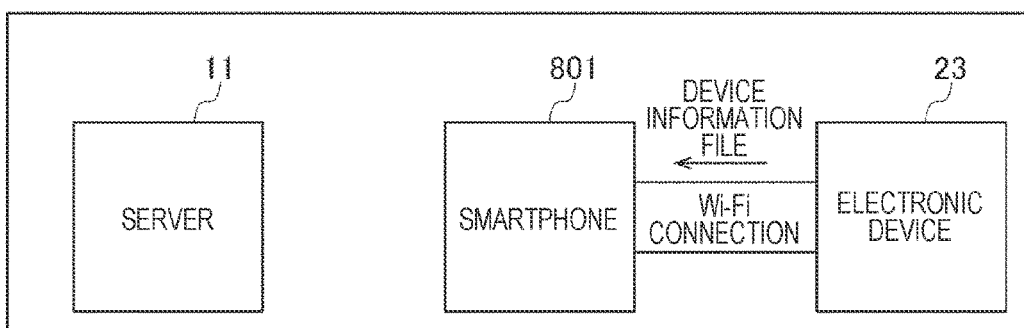
FIGS. 32A and 32B are diagrams illustrating a modification example of a method of exchanging data between the server and the electronic device.
Figure 32B:
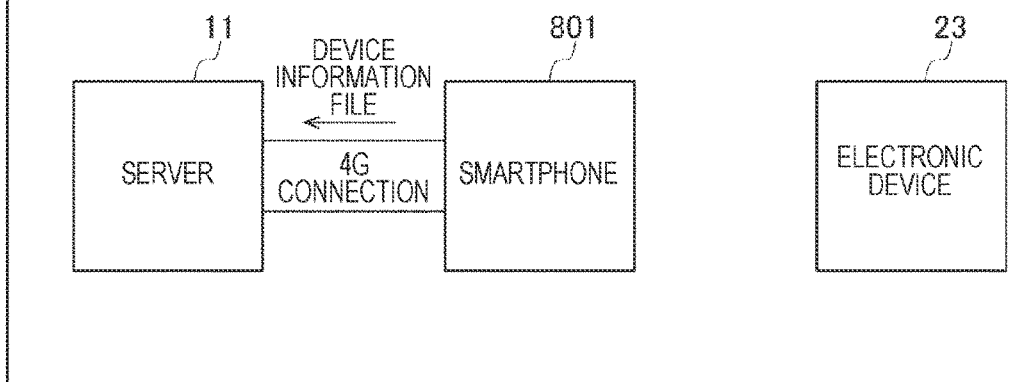

Furthermore, for example, as illustrated in FIGS. 32A and 32B, first, the electronic device 23 and the smartphone 801 are connected by Wi-Fi, and the electronic device 23 transmits the device information file to the smartphone 801.

Next, the server 11 and the smartphone 801 are connected by the 4G communication, and the smartphone 801 transmits the device information file to the server 11. Thus, the license is returned from the electronic device 23 to the server 11.

In this manner, it is possible to install the license provided by the server 11 in the electronic device 23 or return the license from the electronic device 23 to the server 11 without via the medium 22 and without direct communication between the server 11 and the electronic device 23. Furthermore, since security of the communication path between the server 11 and the electronic device 23 is ensured by using the device unique key, falsification and the like of data are prevented.

Note that, for example, short-range wireless communication such as Bluetooth (registered trademark) or near field communication (NFC) may be used for communication between the electronic device 23 and the smartphone 801. Thus, the server 11 and the electronic device 23 can directly communicate with each other via the smartphone 801. However, in this case, the electronic device 23 needs to support the short-range wireless communication.

Moreover, in the above description, an example has been described in which, in a case where the combination of the device unique key used to calculate the hash value in the device information file, and (the installation key corresponding to) the installation key management ID and the device unique ID in the device information file matches the combination of the device unique key, (the installation key corresponding to) the installation key management ID, and the device unique ID stored in the storage unit 106, the return of the license is accepted and validated.

On the other hand, for example, in a case where the combination of the device unique key used to calculate the hash value in the device information file and (the installation key corresponding to) the installation key management ID in the device information file matches the combination of the device unique key and (the installation key corresponding to) the installation key management ID stored in the storage unit 106, the return of the license may be accepted and validated.

In this case, for example, inclusion of the device unique ID in the device information file can be inhibited. Furthermore, for example, in the server 11, the hash value of the storage data in the device information file is calculated using the installation key management ID that matches the installation key management ID in the device information file and the device unique key combined in the storage unit 106. Then, in a case where the calculated hash value matches the hash value in the device information file, the return of the license is accepted.

Furthermore, for example, the license management unit 151 of the server 11 may set a use end date and time (hereinafter referred to as a server use end date and time) instead of the server use start date and time or in addition to the server use start date and time. For example, the license management unit 151 sets the license use end date and time by adding the valid period of the license to the current date and time of the RTC 105 of the server 11 in step S35 in FIG. 13, or by adding the remaining period of the license to the current date and time of the RTC 105 of the server 11 in step S235 in FIG. 28.

In this case, for example, until the date and time of the RTC 105 pass the server use end date and time, the license management unit 151 may respond to return of the license from the electronic device 23 that has provided the license and provision of the license returned from the electronic device 23 to another electronic device 23. Furthermore, for example, the license management unit 151 may set a period from the current date and time of the RTC 105 to the server use end date and time as the remaining period of the license.

Moreover, for example, the license management unit 251 of the electronic device 23 may set a use end date and time (hereinafter referred to as a client use end date and time) on the basis of the current date and time of the RTC 206 and the valid period of the license instead of the client use start date and time or in addition to the client use start date and time. In this case, for example, the license management unit 251 may manage the valid period of the license on the basis of the client use end date and time.

Furthermore, the format of the installation key in FIG. 14 is an example, and can be changed as appropriate.

For example, the installation key may include the server use end date and time instead of the server use start date and time or in addition to the server use start date and time. In this case, for example, the UI control unit 254 of the electronic device 23a may display the valid period of the license in the server 11 on the basis of the server use end date and time on the screen or the like of FIGS. 20 and 21.

Furthermore, for example, some of the data included in the installation key may be stored not in the installation key, but in a file such as the installation request file for transmitting the installation key.

Moreover, in the above description, an example has been described in which the device information file transmitted from the client 21 to the server 11 when the license is returned includes the installation key management ID as the installation key information related to the installation key. On the other hand, for example, the installation key or both the installation key and the installation key management ID may be included in the device information file as the installation key information.

Furthermore, in the above description, an example has been described in which information is transmitted and received mainly in a file format between the server 11 and the client 21, but any other format can be used as the format of information to be transmitted and received.

Moreover, the server 11 does not necessarily need to include the RTC 105. For example, the communication unit 103 of the server 11 may receive information indicating the date and time of the RTC included in another server via the network 13, and the license management unit 151 and the like may use the received date and time of the RTC.

3. Others

<Configuration Example of Computer>

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

Figure 33:
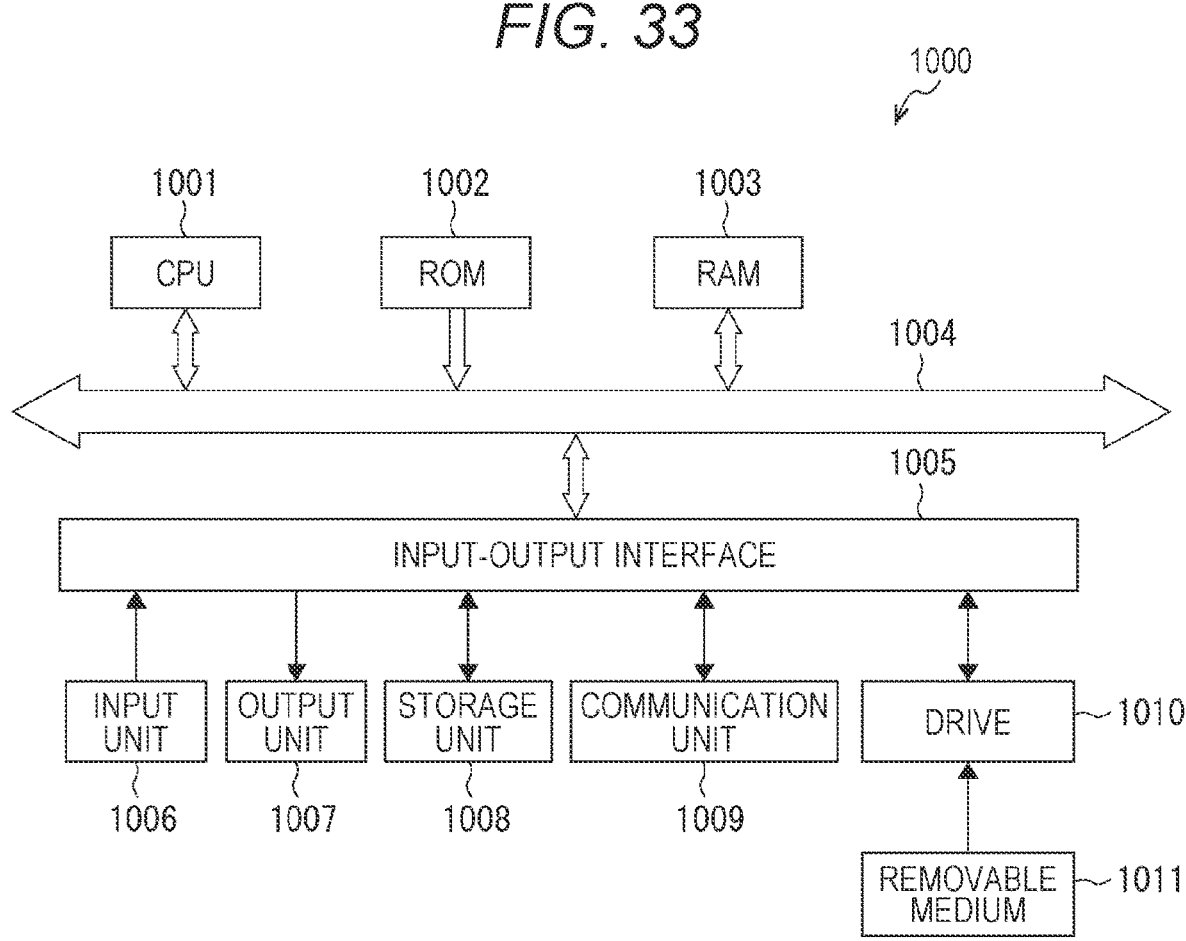
FIG. 33 is a diagram illustrating a configuration example of a computer.

FIG. 33 is a block diagram illustrating a configuration example of hardware of a computer that executes the above-described series of processes by a program.

In a computer 1000, a central processing unit (CPU) 1001, a read only memory (ROM) 1002, and a random access memory (RAM) 1003 are interconnected via a bus 1004.

An input-output interface 1005 is further connected to the bus 1004. An input unit 1006, an output unit 1007, a recording unit 1008, a communication unit 1009, and a drive 1010 are connected to the input-output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communication unit 1009 includes a network interface and the like. The drive 1010 drives a removable recording medium 1011 such as a magnetic disk, an optical disk, a magneto-optical disk, or a semiconductor memory.

In the computer 1000 configured as described above, the CPU 1001 loads, for example, a program recorded in the recording unit 1008 into the RAM 1003 via the input-output interface 1005 and the bus 1004 and executes the program, so as to perform the above-described series of processes.

The program executed by the computer 1000 (CPU 1001) can be provided by being recorded on, for example, a removable recording medium 1011 as a package medium or the like. Furthermore, the program can be provided via a wired or wireless transmission medium such as a local area network, the Internet, or digital satellite broadcasting.

In the computer 1000, the program can be installed in the recording unit 1008 via the input-output interface 1005 by mounting the removable recording medium 1011 to the drive 1010. Furthermore, the program can be received by the communication unit 1009 via a wired or wireless transmission medium and installed in the recording unit 1008. In addition, the program can be installed in the ROM 1002 or the recording unit 1008 in advance.

Note that the program executed by the computer may be a program for processing in time series in the order described in the present description, or a program for processing in parallel or at a necessary timing such as when a call is made.

Furthermore, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Moreover, the embodiments of the present technology are not limited to the above-described embodiments, and various modifications are possible without departing from the gist of the present technology.

For example, the present technology can employ a configuration of cloud computing in which one function is shared by a plurality of devices via a network and processed jointly.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

<Example of Combinations of Configurations>

The present technology can also employ the following configurations.

(1)

An information processing device including
 a license management unit that sets at least one of a first use start date and time or a first use end date and time of a license to be provided to a first electronic device on the basis of a date and time of a hardware clock, and responds to return of the license from the first electronic device and provision of a second electronic device with the license returned from the first electronic device until the date and time of the hardware clock pass a first valid period with reference to the first use start date and time or pass the first use end date and time.

(2)

The information processing device according to (1) above,
 in which in a case where the license returned from the first electronic device is provided to the second electronic device, the license management unit sets at least one of a second use start date and time or a second use end date and time on the basis of the date and time of the hardware clock, and sets a remaining period of the first valid period with reference to the second use start date and time or a period until the second use end date and time as a second valid period of the license.

(3)

The information processing device according to (2) above, further including
 a data generation unit that generates first license communication information including a first installation key for installation of the license in the first electronic device and the first valid period, and second license communication information including a second installation key for installation of the license in the second electronic device and the second valid period.

(4)

The information processing device according to (3) above,
 in which the first license communication information further includes at least one of the first use start date and time or the first use end date and time, and
 the second license communication information further includes at least one of the second use start date and time or the second use end date and time.

(5)

The information processing device according to (3) or (4) above,
 in which the license management unit validates or invalidates the return of the license from the first electronic device on the basis of a combination of installation key information included in license return information that is information generated by the first electronic device and a device unique key that corresponds to the license return information and is unique to the first electronic device.

(6)

The information processing device according to (5) above,
 in which the license return information stores a hash value of data in the license return information, and
 the license management unit calculates a hash value of data in the license return information by using the device unique key, and validates the return of the license from the first electronic device in a case where the calculated hash value matches the hash value in the license return information and the installation key information in the license return information corresponds to the first installation key.

(7)

The information processing device according to (5) above,
 in which the license return information further includes a device unique identifier (ID) that is an ID unique to the first electronic device, and
 the license management unit validates or invalidates the return of the license from the first electronic device on the basis of a combination of the installation key information and the device unique ID included in the license return information and the device unique key corresponding to the license return information.

(8)

The information processing device according to any one of (5) to (7) above,
 in which the license management unit further generates an installation key management ID having a data length shorter than a data length of the first installation key and unique to the first installation key, and
 the first license communication information includes the first installation key and the installation key management ID, and
 the installation key information includes the installation key management ID.

(9)

The information processing device according to any one of (5) to (8) above, further including
 a communication control unit that controls reception of the license return information stored in a removable medium by the first electronic device from another information processing device.

(10)

The information processing device according to any one of (5) to (8) above, further including
 a communication control unit that controls reception of device information from another information processing device, the device information including the device unique key and being stored in a removable medium by the first electronic device.

(11)

The information processing device according to (10) above,
 in which the communication control unit controls transmission of the first license communication information corresponding to the device information to the another information processing device.

(12)

The information processing device according to any one of (5) to (11) above, in which the data generation unit calculates a hash value of data in the first license communication information by using the device unique key, generates a signature by encrypting the hash value by using a secret key, and stores the signature in the first license communication information.

(13)

The information processing device according to any one of (3) to (8) above, further including
a communication control unit that controls transmission of the first license communication information to another information processing device,
in which the first electronic device acquires the first license communication information stored in a removable medium by the another information processing device.

(14)

The information processing device according to any one of (2) to (13) above,
in which the license management unit responds to return of the license from the second electronic device and provision of a third electronic device with the license returned from the second electronic device during a period until the date and time of the hardware clock pass the second valid period or pass the second use end date and time from the second use start date and time.

(15)

The information processing device according to any one of (1) to (14) above, further including
the hardware clock.

(16)

The information processing device according to any one of (1) to (14) above, further including
a communication unit that receives information indicating a date and time of the hardware clock from another information processing device.

(17)

An information processing method including,
by an information processing device:
setting at least one of a use start date and time or a use end date and time of a license to be provided to a first electronic device on the basis of a date and time of a hardware clock; and
responding to return of the license from the first electronic device and provision of a second electronic device with the license returned from the first electronic device until the date and time of the hardware clock pass a predetermined valid period with reference to the use start date and time or pass the use end date and time.

(18)

A program for causing a computer to execute processing including:
setting at least one of a use start date and time or a use end date and time of a license to be provided to a first electronic device on the basis of a date and time of a hardware clock; and
responding to return of the license from the first electronic device and provision of a second electronic device with the license returned from the first electronic device until the date and time of the hardware clock pass a predetermined valid period with reference to the use start date and time or pass the use end date and time.

(19)

An electronic device including:
a first hardware clock; and
a license management unit that sets at least one of a first use start date and time or a first use end date and time of a license provided from a first information processing device on the basis of a date and time of the first hardware clock, and makes a function corresponding to the license usable until the date and time of the first hardware clock pass a predetermined valid period with reference to the first use start date and time or pass the one use end date and time.

(20)

The electronic device according to (19) above,
in which the license management unit installs the license on the basis of license communication information generated by the first information processing device, the license communication information including an installation key for installation of the license and the valid period.

(21)

The electronic device according to (20) above,
in which the license communication information includes at least one of a second use start date and time or a second use end date and time set by the first information processing device on the basis of a date and time of a second hardware clock, and
the electronic device further includes
a user interface control unit that controls display related to a valid period of the license based on the date and time of the second hardware clock on the basis of at least one of the second use start date and time or the second use end date and time.

(22)

The electronic device according to (20) or (21) above,
in which the license communication information includes installation key information corresponding to the installation key, and
the electronic device further includes:
a key generation unit that generates a device unique key that is a key unique to the electronic device; and
a data generation unit that generates license return information including the installation key information, the license return information being information whose security is ensured using the device unique key, the license return information being information used to return the license to the first information processing device.

(23)

The electronic device according to (22) above,
in which the data generation unit calculates a hash value of data in the license return information by using the device unique key, and stores the hash value in the license return information.

(24)

The electronic device according to (22) or (23) above,
in which the license return information further includes a device unique identifier (ID) that is an ID unique to the electronic device.

(25)

The electronic device according to any one of (22) to (24) above,
in which the license communication information includes the installation key and an installation key management ID that is shorter in data length than the installation key and is unique to the installation key, and
the installation key information includes the installation key management ID.

(26)

The electronic device according to any one of (22) to (25) above, in which the data generation unit stores the license return information in a removable medium, and a second information processing device transmits the license return information stored in the removable medium to the first information processing device.

(27)

The electronic device according to (26) above, further including a user interface control unit that controls display related to a remaining period of the license set by the first information processing device on the basis of a date and time of a second hardware clock, on the basis of information transmitted from the first information processing device in response to the license return information and stored in the removable medium by the second information processing device.

(28)

The electronic device according to any one of (22) to (27) above, in which the data generation unit further generates device information that includes the device unique key and is information used for issuance of the license in the first information processing device.

(29)

The electronic device according to (28) above, in which the data generation unit stores the device information in a removable medium, and a second information processing device transmits the device information stored in the removable medium to the first information processing device.

(30)

The electronic device according to (29) above, in which the second information processing device receives the license communication information corresponding to the device information from the first information processing device and stores the license communication information in the removable medium, and the license management unit acquires the license communication information stored in the removable medium.

(31)

The electronic device according to any one of (28) to (30) above, in which the data generation unit calculates a hash value of data in the device information using the device unique key, and stores the hash value in the device information.

(32)

An information processing method including, by an electronic device including a hardware clock:

setting at least one of a use start date and time or a use end date and time of a license provided from an information processing device on the basis of a date and time of the hardware clock; and making a function corresponding to the license usable until the date and time of the hardware clock pass a predetermined valid period with reference to the use start date and time or pass the use end date and time.

(33)

A program for causing a computer of an electronic device including a hardware clock to execute processing including:

setting at least one of a use start date and time or a use end date and time of a license provided from an information processing device on the basis of a date and time of the hardware clock; and making a function corresponding to the license usable until the date and time of the hardware clock pass a predetermined valid period with reference to the use start date and time or pass the use end date and time.

(34)

An information processing system including:

an information processing device;

a first electronic device including a first hardware clock; and a second electronic device, in which the information processing device sets at least one of a first use start date and time or a first use end date and time of a license to be provided to the first electronic device on the basis of a date and time of a second hardware clock, and responds to return of the license from the first electronic device and provision of the second electronic device with the license returned from the first electronic device until the date and time of the second hardware clock pass a predetermined valid period with reference to the first use start date and time or pass the first use end date and time, and the first electronic device sets at least one of a second use start date and time or a second use end date and time on the basis of a date and time of the first hardware clock, and makes a function corresponding to the license usable until the date and time of the first hardware clock pass the valid period with reference to the second use start date and time or pass the one use end date and time.

Note that the effects described in the present description are merely examples and are not limited, and other effects may be provided.

REFERENCE SIGNS LIST

10 Information processing system
11 Server
12 Client
13 Network
21 PC
22 Removable medium
23a, 23b Electronic device
102 Control unit
105 RTC
151 License management unit
152 Data generation unit
153 UI control unit
154 Communication control unit
155 Storage control unit
202 Function execution unit
203 Control unit
206 RTC
208 Drive
251 License management unit
252 Key generation unit
253 Data generation unit
254 UI control unit
255 Communication control unit
256 Storage control unit

The invention claimed is:

1. A first information processing device, comprising:
a central processing unit (CPU) configured to:
set, based on a date and time of a hardware clock, at least one of a first use start date and time or a first use end date and time of a license to be provided to a first electronic device;
respond, until the date and time of the hardware clock one of pass a first valid period with reference to the first use start date and time or pass the first use end date and time, to return of the license from the first electronic device and provision of a second electronic device with the license returned from the first electronic device;

set at least one of a second use start date and time or a second use end date and time, based on the date and time of the hardware clock and the provision of the second electronic device with the license returned from the first electronic device;

set, as a second valid period of the license, one of a remaining period of the first valid period with reference to the second use start date and time or a period until the second use end date and time;

generate first license communication information including a first installation key for installation of the license in the first electronic device and the first valid period;

generate second license communication information including a second installation key for installation of the license in the second electronic device and the second valid period;

control reception of license return information generated by the first electronic device, wherein the license return information includes installation key information and a first hash value of data in the license return information;

calculate a second hash value of the data in the license return information, based on a device unique key that corresponds to the license return information and is unique to the first electronic device; and validate the return of the license from the first electronic device, in a case where the calculated second hash value matches the first hash value in the license return information and the installation key information in the license return information corresponds to the first installation key.

2. The first information processing device according to claim 1,
wherein the first license communication information further includes the at least one of the first use start date and time or the first use end date and time, and
the second license communication information further includes the at least one of the second use start date and time or the second use end date and time.

3. The first information processing device according to claim 1,
wherein the license return information further includes a device unique identifier (ID) that is an ID unique to the first electronic device, and
the CPU is further configured to one of validate or invalidate the return of the license from the first electronic device, based on a combination of the installation key information and the device unique ID included in the license return information and the device unique key corresponding to the license return information.

4. The first information processing device according to claim 1,
wherein the CPU is further configured to generate an installation key management ID having a data length shorter than a data length of the first installation key and unique to the first installation key, and
the first license communication information further includes the installation key management ID, and
the installation key information includes the installation key management ID.

5. The first information processing device according to claim 1, wherein the CPU is further configured to control the reception of the license return information stored in a removable medium by the first electronic device, from a second information processing device.

6. The first information processing device according to claim 1, wherein the CPU is further configured to control reception of device information from a second information processing device, the device information including the device unique key and being stored in a removable medium by the first electronic device.

7. The first information processing device according to claim 6, wherein the CPU is further configured to control transmission of the first license communication information corresponding to the device information to the second information processing device.

8. The first information processing device according to claim 1, wherein the CPU is further configured to generate a signature of data in the first license communication information based on a secret key, and store the signature in the first license communication information.

9. The first information processing device according to claim 1, wherein
the CPU is further configured to control transmission of the first license communication information to a second information processing device, and
the first electronic device acquires the first license communication information stored in a removable medium by the second information processing device.

10. The first information processing device according to claim 1, wherein the CPU is further configured to respond, during a period until the date and time of the hardware clock one of pass the second valid period or pass the second use end date and time from the second use start date and time, to return of the license from the second electronic device and provision of a third electronic device with the license returned from the second electronic device.

11. The first information processing device according to claim 1, further comprising the hardware clock.

12. The first information processing device according to claim 1, further comprising a communication circuit configured to receive information indicating the date and time of the hardware clock from a second information processing device.

13. An information processing method, comprising:
by an information processing device:
setting, based on a date and time of a hardware clock, at least one of a first use start date and time or a first use end date and time of a license to be provided to a first electronic device;
responding, until the date and time of the hardware clock one of pass a first valid period with reference to the first use start date and time or pass the first use end date and time, to return of the license from the first electronic device and provision of a second electronic device with the license returned from the first electronic device;
setting at least one of a second use start date and time or a second use end date and time, based on the date and time of the hardware clock and the provision of the second electronic device with the license returned from the first electronic device;
setting, as a second valid period of the license, one of a remaining period of the first valid period with reference to the second use start date and time or a period until the second use end date and time;

generating first license communication information including a first installation key for installation of the license in the first electronic device and the first valid period;

generating second license communication information including a second installation key for installation of the license in the second electronic device and the second valid period;

controlling reception of license return information generated by the first electronic device, wherein the license return information includes installation key information and a first hash value of data in the license return information;

calculating a second hash value of the data in the license return information, based on a device unique key that corresponds to the license return information and is unique to the first electronic device; and validating the return of the license from the first electronic device, in a case where the calculated second hash value matches the first hash value in the license return information and the installation key information in the license return information corresponds to the first installation key.

14. A non-transitory computer-readable medium having stored thereon, computer-executable instructions which, when executed by a computer, cause the computer to execute operations, the operations comprising:

setting, based on a date and time of a hardware clock, at least one of a first use start date and time or a first use end date and time of a license to be provided to a first electronic device;

responding, until the date and time of the hardware clock one of pass a first valid period with reference to the first use start date and time or pass the first use end date and time, to return of the license from the first electronic device and provision of a second electronic device with the license returned from the first electronic device;

setting at least one of a second use start date and time or a second use end date and time, based on the date and time of the hardware clock and the provision of the second electronic device with the license returned from the first electronic device;

setting, as a second valid period of the license, one of a remaining period of the first valid period with reference to the second use start date and time or a period until the second use end date and time;

generating first license communication information including a first installation key for installation of the license in the first electronic device and the first valid period;

generating second license communication information including a second installation key for installation of the license in the second electronic device and the second valid period;

controlling reception of license return information generated by the first electronic device, wherein the license return information includes installation key information and a first hash value of data in the license return information;

calculating a second hash value of the data in the license return information, based on a device unique key that corresponds to the license return information and is unique to the first electronic device; and validating the return of the license from the first electronic device, in a case where the calculated second hash value matches the first hash value in the license return information and the installation key information in the license return information corresponds to the first installation key.

\* \* \* \* \*